United States Patent
Hamasaki et al.

(10) Patent No.: US 7,198,412 B2
(45) Date of Patent: Apr. 3, 2007

(54) HOLDER OF OPTICAL TRANSMISSION LINES AND MULTI-CORE OPTICAL WAVE-GUIDE

(75) Inventors: Hiroshi Hamasaki, Hiratsuka (JP); Hideto Furuyama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 249 days.

(21) Appl. No.: 11/014,833

(22) Filed: Dec. 20, 2004

(65) Prior Publication Data

US 2005/0169596 A1 Aug. 4, 2005

(30) Foreign Application Priority Data

Dec. 26, 2003 (JP) .............................. 2003-435827

(51) Int. Cl.
*G02B 6/36* (2006.01)
*H01R 13/00* (2006.01)
*H01R 33/945* (2006.01)

(52) U.S. Cl. ............................ 385/88; 385/14; 385/89; 385/92; 439/485; 439/487; 439/577

(58) Field of Classification Search .................. 385/14, 385/88–94; 439/485, 487, 577; 257/701, 257/706
See application file for complete search history.

(56) References Cited

U.S. PATENT DOCUMENTS

| 6,517,259 B1 * | 2/2003 | Murata ......................... 385/92 |
| 2005/0169596 A1 | 8/2005 | Hamasaki et al. |

2006/0140534 A1 * 6/2006 Liu et al. ....................... 385/14

FOREIGN PATENT DOCUMENTS

| JP | 08-160242 | 6/1996 |
| JP | 2000-039541 | 2/2000 |

(Continued)

OTHER PUBLICATIONS

U.S. Appl. No. 11/204168 to Furuyama et al.*
U.S. Appl. No. 11/012273 to Furuyama et al.*
U.S. Appl. No. 10/898337 to Hamasaki et al.*
U.S. Appl. No. 11/081617 to Furuyama et al.*
U.S. Appl. No. 11/472,367, filed Jun. 22, 2006, Hamasaki et al.
U.S. Appl. No. 11/442,276, filed May 30, 2006, Hamasaki et al.

*Primary Examiner*—Brian Healy
*Assistant Examiner*—Derek L. Dupuis
(74) *Attorney, Agent, or Firm*—Oblon, Spivak, McClelland, Maier & Neustadt, P.C.

(57) ABSTRACT

A holder of optical transmission lines encompasses an insulating base body defined by a mounting face to mount an optical device chip, an opposing face opposing to the mounting face and side faces which connect between the mounting face and the opposing face, one of side faces is assigned as an interconnection face, and provided with through-holes penetrating between the mounting face and the opposing face so as to hold optical transmission lines, the through-holes define openings on the mounting face; electric interconnections extending from respective vicinities of the opening on the mounting face on to the interconnection face; and heat conduction passages assigned alternately with the electric interconnections, extending from the mounting face on to the interconnection face, each of the heat conduction passages is longer than the electric interconnections on the interconnection face.

20 Claims, 15 Drawing Sheets

FOREIGN PATENT DOCUMENTS

| | | |
|---|---|---|
| JP | 2000-357804 | 12/2000 |
| JP | 2001-154035 | 6/2001 |
| JP | 2002-261372 | 9/2002 |
| JP | 2002-350681 | 12/2002 |
| JP | 2004-86069 | 3/2004 |
| JP | 2004-119475 | 4/2004 |

* cited by examiner

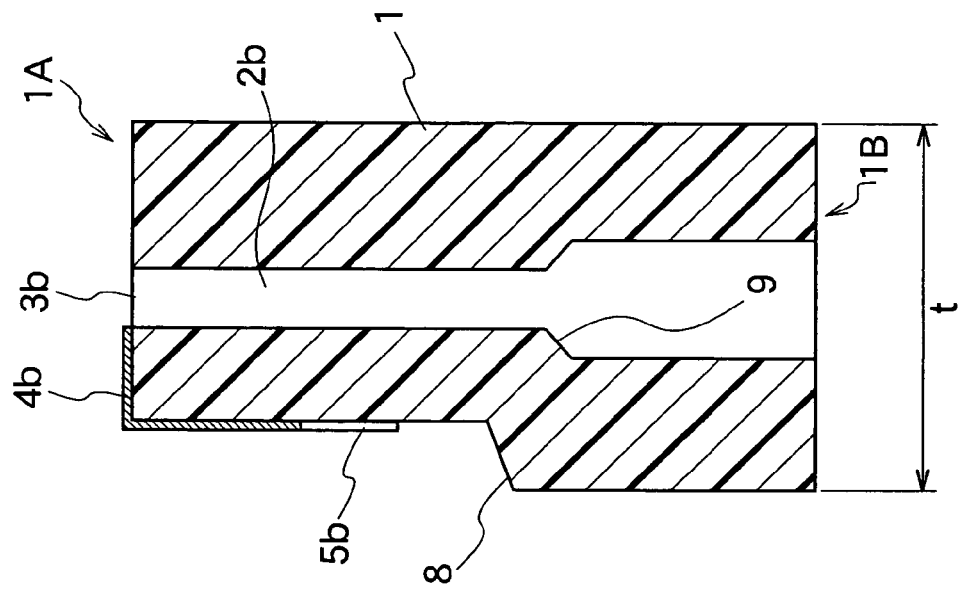
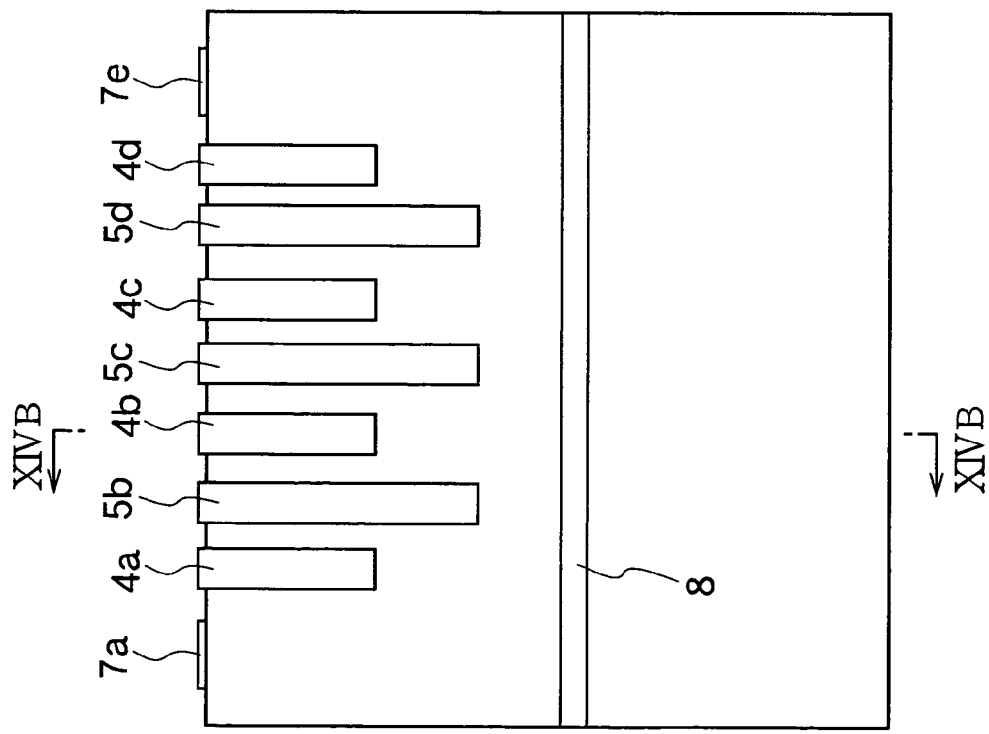

HOLDER OF OPTICAL TRANSMISSION LINES AND MULTI-CORE OPTICAL WAVE-GUIDE

CROSS REFERENCE TO RELATED APPLICATIONS AND INCORPORATION BY REFERENCE

This application claims benefit of priority under 35 USC 119 based on Japanese Patent Application No. P2003-435827 filed Dec. 26, 2003, the entire contents of which are incorporated by reference herein.

BACKGROUND OF THE INVENTION

1. Field of the Invention

The present invention relates to a holder of optical transmission lines and a holder for a multi-core optical wave-guide.

2. Description of the Related Art

Recently, optical communication techniques and optical transmission technologies in which signals are transmitted by a carrier wave, modulated by intensity modulation or phase modulation, etc., has been widely adopted. For facilitating such optical transmissions, an optical semiconductor module for optically coupling optical transmission lines such as a bundle of optical fibers to an optical device chip, which integrates a plurality of optical semiconductor elements such as light-emitting elements and/or photo-detecting elements, with a high-precision position controlling technology are required.

As optical signals transmitted in the optical semiconductor module become high-speed, dimensions of the light-emitting region and the light-receiving region of the elements must decrease because parasitic capacitances of light-emitting elements and photo-detecting elements cannot be ignored. For instance, a diameter of light-receiving face of GaAs based pin photodiode is miniaturized to about 50–60 μm so as to obtain a response in a region over 10 Gbps. With such a small light-receiving region, optical coupling efficiency decreases, because a light beam emitted from a multimode optical fiber expands larger than the diameter of the light-receiving face of the photo-detecting element. The decrease in the optical coupling efficiency deteriorates noise-proof performance, and problems such that the signal cannot propagate enough distance is caused.

Further, so as to take enough tolerance of the displacement of the relative position of the optical semiconductor elements, which are integrated with an array configuration in the optical device chip, against corresponding cores of the optical fibers, a lens is inserted in the optical paths. However, the insertion of the lens increases the number of packaging components, which makes controlling of the position more and more difficult, and the packaging cost tends to rise.

Then, for the purpose of reduction of the packaging cost, direct optical coupling architecture called "butt joint", in which lights are directly coupled into an optical fiber, by disposing the optical fiber close to the optical device chip so the optical fiber faces to the optical device chip, without using a lens, has been researched and developed. In the direct optical coupling architecture, because light emitted from the optical semiconductor element or light emitted from the optical fiber transmit through an intervening medium having a substantially homogenous refractive index such as air and/or refractive index matching material, which has no wave-guiding characteristics, the beam of the emitted light expand in the intervening medium. Therefore, the relative portion of light which reaches another area other than the targeted wave guiding region (core) of the optical fiber or the targeted active region of the photo-detecting element increases so as to decrease the optical coupling efficiency, which deteriorates the noise-proof performance. In addition, different kinds of noises such as crosstalk noise increase with the increase of stray light, and an adverse effect may be caused in the signal transmission. Therefore, a configuration where the optical fiber is disposed closer and closer to the optical device chip becomes important so that light emitted from the optical fiber does not reach another area other than the targeted region.

For instance, light emitted from a multimode optical fiber having a numerical aperture (NA)=0.21 and a diameter of 50 μm establishes a divergent angle of about 12 degrees in the air. Therefore, the distance from the optical fiber to the optical device chip must be as close as several decade μm.

Therefore, a holder, which is also called "an optical fiber ferrule", configured to hold optical fibers into sleeves formed in the holder is proposed, so that a plurality of electrical interconnections are delineated directly on the main face of the holder. The holder mounts an optical device chip on the main face, and a plurality of optical fibers are accommodated by the holder so that the end faces of the optical fibers can face to the corresponding active regions (emitting/receiving regions) of the optical device chip. With the optical fiber ferrule, the emitting/receiving elements can be assembled very close to the end face of the optical fiber. And since optical semiconductor elements can be assembled directly on the optical fiber ferrule using the location of the optical fibers as a reference location, a package having a high accuracy in the lateral direction, suppressing an increase in the number of components, and suitable for low-cost packaging, using an usual flip chip packaging, can be provided. In addition, the manufacturing cost of the optical fiber ferrule can be drastically reduced by using resin for the substrate material of the holder. And by delineating the electrical interconnections from the main face where a plurality of openings of the sleeves for the optical fibers are cut over to a side face, orthogonal transformation of the plane is achieved so that the direction along which the optical fibers extend and the mounting face of the optical fiber ferrule are in parallel, thereby preventing a configuration in which the optical fibers extend perpendicular to the mounting face. However, according to the configuration of the earlier technology, a heat conduction passage for heat generated in the emitting/receiving elements are only electrical interconnections designed for signal extraction, although thermal flow can be achieved by heat radiation into the air. Especially, when the substrate material of the optical fiber ferrule is made of resin, thermal transport can hardly be ensured, since heat radiation to a substrate material of the holder is extremely bad. Therefore, measures such as installing a heat conduction passage from outside to a back surface of the optical device chip in which the optical semiconductor elements are merged, for example, is required, which increases the manufacturing cost. And such a problem becomes serious in the case of "an optical semiconductor device array" in which a plurality of optical semiconductor elements are integrated in an optical device chip. Since a semiconductor substrate (semiconductor chip) which merges optical semiconductor elements, is made from a comparatively low thermal resistance material, each of the optical semiconductor elements integrated in a single optical device chip thermally interfere, and are susceptible to variations in mark densities (duty factors) and/or operating currents of adjacent optical semiconductor elements. It is very difficult to add external heat conduction passages in every optical semiconductor element so as to prevent thermal interference between the optical semiconductor elements.

In this manner, in a configuration in which electrical interconnections are delineated directly on a main face of the holder, and active regions (emitting/receiving regions) of the optical device chip are arranged to face optical fibers on the main face so as to couple optical fibers directly, as the heat conduction passages for heat generated in the optical semiconductor elements, only electrical interconnections for signal extraction and heat radiation into the air can be utilized. However, since extending the length of electrical interconnections increases capacitance, inductance, and/or resistance associated with the interconnections so as to deteriorate the performance of the optical fiber ferrule, it is impossible to extend the length of interconnections over the required minimum length. Therefore, a sufficient heat radiation effect cannot be expected. Especially, in the case where the holder (optical fiber ferrule) is made of resin, means for thermal transport is hardly ensured, since heat radiation to a substrate material of the holder is extremely bad. The methodology of installing external heat conduction passages to the back surface of the optical device chip in which the optical semiconductor elements are merged, etc might be acceptable for ensuring means for thermal transport, but the installation of the heat conduction passages to the back surface increases the manufacturing cost. Such a problem becomes serious for the optical semiconductor device array in which a plurality of optical semiconductor elements are integrated in a single optical device chip. Since thermal resistance of a semiconductor substrate (semiconductor chip), in which the optical semiconductor elements are merged, is comparatively low, each of the optical semiconductor elements monolithically integrated in the optical device chip thermally interfere mutually, and are susceptible to the variation of mark density and/or operating current of adjacent optical semiconductor elements.

SUMMARY OF THE INVENTION

In view of these situations, it is an object of the present invention to provide a holder, which facilitates coupling between an optical device chip, in which a plurality of optical semiconductor elements are monolithically integrated, and optical transmission lines directly and with a low-cost, suppressing thermal interference between the optical semiconductor elements.

An aspect of the present invention may inhere in a holder of optical transmission lines, encompassing an insulating base body defined by a mounting face configured to mount an optical device chip, an opposing face opposing to the mounting face and a plurality of side faces which connect between the mounting face and the opposing face, one of side faces is assigned as an interconnection face, and provided with a plurality of through-holes penetrating between the mounting face and the opposing face so as to hold a plurality of optical transmission lines, the through-holes define a plurality of openings on the mounting face by intersecting the mounting face; a plurality of electric interconnections extending from respective vicinities of the opening on the mounting face on to the interconnection face; and a plurality of heat conduction passages assigned alternately with the electric interconnections, extending from the mounting face on to the interconnection face, each of the heat conduction passages has a length longer than the length of the electric interconnections on the interconnection face.

Another aspect of the present invention may inhere in a holder of a multi-core optical wave-guide, encompassing an insulating base body defined by a mounting face configured to mount an optical device chip, an opposing face opposing to the mounting face and a plurality of side faces which connect between the mounting face and the opposing face, one of side faces is assigned as an interconnection face, and provided with a through-hole penetrating between the mounting face and the opposing face so as to hold the multi-core optical wave-guide, the through-hole define an opening on the mounting face by intersecting the mounting face; a plurality of electric interconnections extending from vicinity of the opening on the mounting face on to the interconnection face; and a plurality of heat conduction passages assigned alternately with the electric interconnections, extending from the mounting face on to the interconnection face, each of the heat conduction passages has a length longer than the length of the electric interconnections on the interconnection face.

BRIEF DESCRIPTION OF THE DRAWINGS

FIG. 14A is a plan view showing a holder according to a modification (a first modification) of the third embodiment of the present invention;

FIG. 14B is a cross-sectional view taken on line XIVB—XIVB in FIG. 14A;

DETAILED DESCRIPTION OF THE INVENTIOPN

Figure 1:
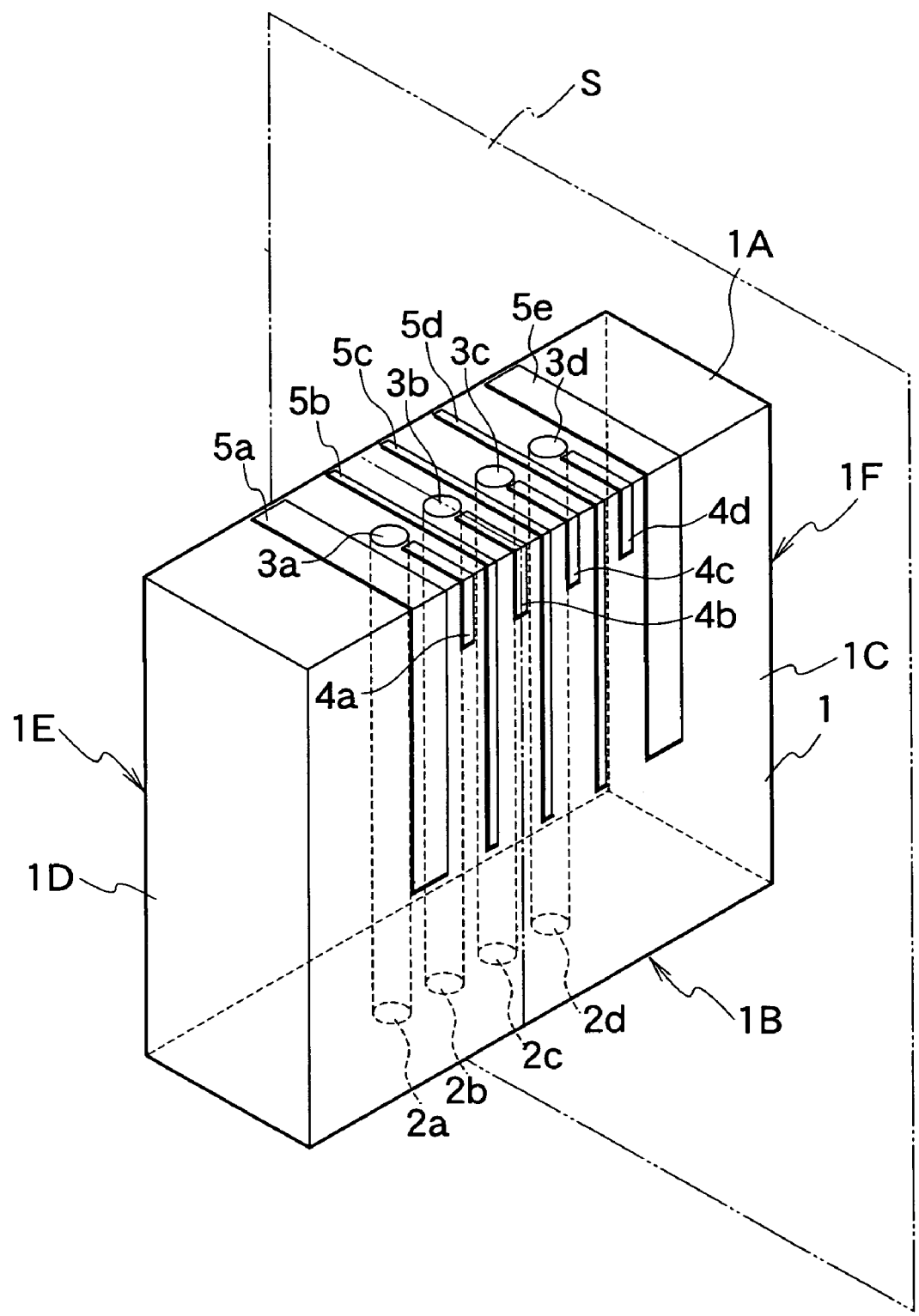
FIG. 1 is a schematic bird's-eye view illustrating a configuration of a holder according to a first embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified. Generally and as it is conventional in the representation of optical semiconductor modules, it will be appreciated that the various drawings are not drawn to scale from one figure to another nor inside a given figure, and in particular that the layer thicknesses are arbitrarily drawn for facilitating the reading of the drawings.

In the following description specific details are set forth, such as specific materials, process and equipment in order to provide a thorough understanding of the present invention. It will be apparent, however, to one skilled in the art that the present invention may be practiced without these specific details. In other instances, well-known manufacturing materials, process and equipment are not set forth in detail in order not to unnecessary obscure the present invention. Prepositions, such as "on", "over", "under", "beneath", and "normal" are defined with respect to a planar surface of the substrate, regardless of the orientation in which the substrate is actually held. A layer is on another layer even if there are intervening layers.

FIRST EMBODIMENT

As shown in FIG. 1, a holder 1 according to a first embodiment of the present invention encompasses an insulating base body 1, a plurality of electric interconnections 4a, 4b, 4c, 4d and a plurality of heat conduction passages 5a, 5b, 5c, 5d, 5e. The insulating base body 1 is defined by a mounting face 1A configured to mount an optical device chip, an opposing face 1B opposing to the mounting face 1A and a plurality of side faces 1B, 1D, 1E, 1F which connect between the mounting face 1A and the opposing face 1B. The electric interconnections 4a, 4b, 4c and 4d are delineated in parallel, extending from the mounting face 1A to one side (first side) face 1C among a plurality of side faces 1C, 1D, 1E and 1F. Hereinafter, the first side face 1C may be referred as "the interconnection face 1C". On the mounting face 1A, the electric interconnections 4a, 4b, 4c and 4d extend from respective vicinities of a plurality of openings 3a, 3b, 3c and 3d cut at the mounting face 1A. As used hereinafter, "the vicinities of the openings" means nearby, surrounding areas of the openings, or respective adjoining areas of the openings, which may lie within 25 µm, or preferably within 10 µm from the openings. The meaning of "the vicinities of the openings" will become clear in the descriptions relating to FIGS. 4A and 4B. The openings 3a, 3b, 3c and 3d are defined so that a plurality of cylindrical through-holes (holding sleeves) 2a, 2b, 2c and 2d intersect the mounting face 1A. The cylindrical through-holes 2a, 2b, 2c and 2d penetrate between the mounting face 1A and the opposing face 1B so as to mechanically hold a plurality of optical transmission lines. The heat conduction passages (heat conduction strips) 5a, 5b, 5c, 5d and 5e are assigned alternately with the electric interconnections 4a, 4b, 4c and 4d, extending on one side (first side) face 1C, and each of the heat conduction passages 5a, 5b, 5c, 5d and 5e has a length on the one side (first side) face 1C longer than the length of the electric interconnections 4a, 4b, 4c and 4d. In FIG. 1, the first side face (interconnection face) 1C and a third side face (hereinafter may be referred as "the bonding face") 1E are in parallel with each other, and a second side face 1D and a fourth side face 1F are orthogonal to the interconnection face (first side face) 1C and the bonding face (third side face) 1E. The first side face (interconnection face) 1C, the second side face 1D, the third side face (bonding face) 1E and the fourth side face 1F implement a quadrangular pipe. In FIG. 1, an example in which a geometry of rectangular parallelepiped geometry implemented by four side faces of the first side face 1C, the second side face 1D, the third side face 1E and the fourth side face 1F, connecting between the mounting face 1A and the opposing face 1B, is shown. However, geometry of the insulating base body 1 is not limited to a rectangular parallelepiped. And in FIG. 1, a plurality of heat conduction passages (heat conduction strips) 5a, 5b, 5c, 5d and 5e are assigned in parallel, alternately between a plurality of openings 3a, 3b, 3c, 3d . . . , the heat conduction passages 5a, 5b, 5c, 5d and 5e are delineated longer than the electric interconnections 4a, 4b, 4c and 4d at the mounting face 1A. In other words, the heat conduction passages 5a, 5b, 5c, 5d and 5e must be delineated alternately such that each of the openings 3a, 3b, 3c, 3d . . . can be partitioned by the heat conduction passages 5a, 5b, 5c, 5d and 5e. Namely, the heat conduction passages 5a, 5b, 5c, 5d and 5e must be allocated alternately in positions where active regions of optical semiconductor elements, which are integrated in an optical device chip mounted on the mounting face 1A can be partitioned by the heat conduction passages 5a, 5b, 5c, 5d and 5e. Further, as shown in FIG. 1, it is advantageous from the viewpoint of thermal isolation, that in locations between the openings 3a, 3b, 3c, 3d, . . . , the heat conduction passages 5b, 5c and 5d should be delineated so long that the heat conduction passages 5b, 5c and 5d can span from the interconnection face (first side face) 1C over to the bonding face (third side face) 1E.

For the material of the insulating base body 1, various organic materials such as synthetic resin and inorganic materials such as ceramic, glass, etc. can be acceptable.

Organic based resin includes epoxy resin, polyphenylene-sulphide (PPS) resin, polybutylene terephthalate (PBT) resin, phenol resin, polyester resin, polyimide resin, fluorocarbon polymers, etc. And glass and quartz are usable when a transparent substrate is necessary for the insulating base body $1$. Alumina ($Al_2O_3$), mullite ($3Al_2O_3 \cdot 2SiO_2$), zirconia ($ZrO_2$), beryllia (BeO), aluminum nitride (AlN), silicon carbide (SiC), etc. are usable as ceramic substrates of the insulating base body $1$. Especially, it is suitable to use epoxy resin in which about 80% of glass filler of about 30 μm is mixed for establishing the through-holes $2a$, $2b$, $2c$ and $2d$ since the through-holes $2a$, $2b$, $2c$ and $2d$ can be formed simply and highly-precisely, using resin-mold methodology with a specific metal mold.

The through-holes $2a$, $2b$, $2c$ and $2d$ extend in a direction parallel with the interconnection face (first side face) $1C$, the second side face $1D$, the bonding face (third side face) $1E$ and the fourth side face $1F$, and are established orthogonal to the mounting face $1A$ and the opposing face $1B$. In FIG. $1$, four through-holes $2a$, $2b$, $2c$ and $2d$ are arranged between the interconnection face (first side face) $1C$ and the bonding face (third side face) $1E$ along the faces which run in parallel with the interconnection face (first side face) $1C$ and the bonding face (third side face) $1E$. However, the number of through-holes is not limited to four, it may be below three or above five. Generally the outer diameter of a cladding layer of an optical fiber is 125 μm, the inside diameter of the through-holes $2a$, $2b$, $2c$ and $2d$ may be set to about 125.5–128 μm for the outer diameter of the cladding layer of the optical fiber 125 μm. A pitch of an arrangement of the through-holes $2a$, $2b$, $2c$ and $2d$ may be selected as a double of the outer diameter of the cladding layer, taking the outer diameter of the coating layer which covers the optical fiber into consideration.

In FIG. $1$, three heat conduction passages (heat conduction strips) $5b$, $5c$ and $5d$ are alternately inserted into each space of the four electric interconnections $4a$, $4b$, $4c$ and $4d$. In addition, two heat conduction passages (heat conductive strips) $5a$ and $5e$, which are wider than the three heat conduction passages $5b$, $5c$ and $5d$, are arranged in the outside of the electric interconnections $4a$ and $4d$. The wider heat conduction passages $5a$ and $5e$ are supplementary delineated so as to keep a symmetrical topology of heat flow with the narrower heat conduction passages $5b$, $5c$ and $5d$ located inside of the electric interconnections $4a$ to $4d$, in the holder $1$ of the first embodiment.

FIG. $2$ is a cross-sectional view of the holder $1$ according to the first embodiment of the present invention taken on plane S, along a direction in which the through-hole $2b$ extends in FIG. $1$. As shown in the cross-sectional view of FIG. $2$, the electric interconnect $4b$ extends on the surfaces of the base body $1$, covering over to the interconnection face (first side face) $1C$ from the mounting face $1A$. And at the rear side of the electric interconnect $4b$, the heat conduction passage $5b$ also extends to the interconnection face (first side face) $1C$ from the mounting face $1A$. Though illustrations are omitted, the other electric interconnections $4a$, $4c$, $4d$ and the other heat conduction passages $5a$, $5c$, $5d$, $5e$ also extend on the surfaces of the base body $1$ to the interconnection face (first side face) $1C$ from the mounting face $1A$.

FIG. $3$ is a schematic bird's-eye view in which a plurality of optical fibers $31a$, $31b$, $31c$, $31d$, . . . as optical transmission lines are held by the holder $1$ of the first embodiment. The optical fibers $31a$, $31b$, $31c$, $31d$, . . . are arranged as an optical fiber array and implement an optical fiber bundle.

The axial direction of the optical fibers $31a$, $31b$, $31c$, $31d$, . . . as the optical transmission lines, is kept parallel with the direction of the electric interconnections $4a$, $4b$, $4c$, $4d$, . . . on the interconnection face (first side face) $1C$ by a configuration in which the electric interconnections $4a$, $4b$, $4c$, $4d$, . . . extend to the interconnection face (first side face) $1C$ from the mounting face $1A$. The configuration in which the axial direction of the optical transmission line (optical fibers) $31a$, $31b$, $31c$, $31d$, . . . is perpendicular to the mounting face can facilitate the thinning of an optical semiconductor module as a whole.

The electric interconnections $4a$, $4b$, $4c$, $4d$, . . . are delineated as strip patterns of metallic thin films such as aluminum (Al) and copper (Cu) etc, and can be easily delineated by metallization processes with a metal mask, on which the metallic thin film is formed by sputtering or plating technique. The electric interconnections $4a$, $4b$, $4c$, $4d$, . . . can also be made of other metallic thin films including copper alloys such as Cu—Fe, Cu—Cr, Cu—Ni—Si, Cu—Sn etc, ferronickel-alloys such as Ni—Fe, Fe—Ni—Co etc, and composite material of copper and stainless steel, etc. In addition, these electric interconnections may be provided by nickel (Ni) plating and/or gold (Au) plating, etc. on these metallic materials. Titanium (Ti) and platinum (Pt) are also available as an under-laying metal.

The strip patterns of the heat conduction passages $5b$, $5c$, $5d$, . . . can be implemented by highly heat-conductive materials such as semiconductor thin films including amorphous Si and, poly-crystalline Si deposited by sputtering technique or CVD method. The strip patterns of the heat conduction passages $5b$, $5c$, $5d$, . . . may be formed by ceramic thin films such as aluminum nitride (AlN) and insulating materials such as epoxy resin having a high thermal conductivity. The heat conduction passages $5b$, $5c$, $5d$, . . . are also made of highly heat-conductive materials such as poly-crystalline diamond, fullerene, and carbon nanotube (CNT) produced by chemical vapor deposition (CVD).

Further, similar to the electric interconnections $4a$, $4b$, $4c$, $4d$, . . . , the heat conduction passages $5a$, $5b$, $5c$, $5d$, $5e$, . . . may be formed, utilizing a metal mask, by sputtering metallic thin films such as aluminum (Al) and copper (Cu) etc. And a composite structure such as a copper (Cu) film coated by gold (Au) film may be used for the heat conduction passages $5a$, $5b$, $5c$, $5d$, $5e$, . . . When the heat conduction passages $5a$, $5b$, $5c$, $5d$, $5e$, . . . are made from metallic materials, because the heat conduction passages $5a$, $5b$, $5c$, $5d$, $5e$, . . . have electric conductivity simultaneously, the heat conduction passages $5a$, $5b$, $5c$, $5d$, $5e$, . . . can be used as ground lines so as to electrically isolate the electric interconnections $4a$, $4b$, $4c$, $4d$, . . . .

Anyway, the holder $1$ according to the first embodiment of the present invention has a very high accuracy of 1 μm or less and can be mass-produced at a very low-cost.

FIG. $4A$ is a schematic bird's-eye view of an optical device chip $21$ mounted on the holder $1$ according to the first embodiment of the present invention, FIG. $4B$ is a schematic bird's-eye view explaining a configuration in which thermal joints (heat conductive bumps) and electric joints (electrical conductive bumps), which are necessary for mounting the optical device chip $21$ on the mounting face $1A$ of the holder $1$ explained already in FIG. $1$, are disposed on the heat conduction passages $5a$, $5b$, $5c$, $5d$, $5e$, . . . and the electric interconnections $4a$, $4b$, $4c$, $4d$, . . . , respectively. As shown in FIG. $4A$, on the surface of the optical device chip $21$, a plurality of active regions $22a$, $22b$, $22c$, $22d$, . . . are integrated. In addition, a plurality of electric interconnections 26a, 26b, 26c, 26d, . . . for signal input/output and a plurality of chip-site heat conduction passages 27a, 27b, 27c, 27d, 27e, . . . are delineated on the surface of the optical device chip 21.

When the optical device chip 21 is an array of photo-detecting elements, a plurality of contact regions implemented by high impurity concentration regions, in which donors or acceptors of about $1\times10^{18}$ cm$^{-3}$–$1\times10^{21}$ cm$^{-3}$ are doped, are formed at the most upper level of the active regions 22a, 22b, 22c, 22d, . . . . The contact regions serve as anode regions or cathode regions of pin diodes. Then, on the top surface of the contact region of the active regions 22a, 22b, 22c, 22d, . . . a plurality of metallic electrodes which can facilitate ohmic contact with the active regions 22a, 22b, 22c, 22d, . . . are connected so as to implement a plurality of electric interconnections 26a, 26b, 26c, 26d, . . . surrounding entrance windows of the photo-detecting elements. The diameter of the entrance windows are larger than the outer diameters of cores of the optical fibers, with circular frame configurations. Generally, the outer diameter of a core of a multi-mode optical fiber is 50 µm and the outer diameter of a core of a single-mode optical fiber is 9 µm. The outer diameters of the active regions 22a, 22b, 22c, 22d, . . . may preferably be set larger than the outer diameter of the cores mentioned above, so that the active region 22a, 22b, 22c, 22d, . . . can receive all of the light beams emitted from the cores of the optical fibers, from the viewpoint of achieving high efficiency. According to operational frequency bands of the optical signals employed, there might be a case in which owing to a delay due to the CR time constant of elements, the area of the active regions are limited. Since, for instance, to receive an optical signal of 10 Gbps, a circular geometry about 60 µm diameter becomes an upper limit for a GaAs based photo-detecting element, it is necessary that a photo-detecting element is disposed very close to the end face of the optical fibers when beam divergence is considered. Instead of metallic electrodes, transparent electrodes such as tin (Sn) doped indium oxide ($In_2O_3$) film (ITO), indium (In) doped zinc oxide (ZnO) film (IZO), gallium (Ga) doped zinc oxide film (GZO), tin oxide ($SnO_2$) may be used. Then, the electric interconnections 26a, 26b, 26c, 26d, . . . made of metals such as aluminum (Al) or aluminum alloy (Al—Si, Al—Cu—Si), can be connected to the transparent electrodes so as to implement ohmic contacts with the transparent electrodes.

When the optical device chip 21 is an array of light-emitting elements such as surface emitting laser diodes, the active regions 22a, 22b, 22c, 22d, . . . correspond to light-emitting faces of the light-emitting elements, which are integrated in an element formation region of an optical device chip 21 implemented by a substrate of a compound semiconductor, etc. In the active region 22a, 22b, 22c, 22d, . . . , a plurality of metallic electrodes (first main metallic electrodes) for facilitating ohmic contact with electrode regions (first main electrode regions), which implement anode regions or cathode regions of the light-emitting elements, are delineated. The metallic electrodes (first main metallic electrodes) surround each of the light-emitting faces, which is smaller than the core of the optical fiber, in a circular frame configuration. And each of the metallic electrodes (first main metallic electrodes) may well be merged with the corresponding one of the electric interconnections 26a, 26b, 26c, 26d, . . . so as to implement a single piece of a metallic pattern. The diameter of the light-emitting face of the surface emitting laser diode can sufficiently be made smaller than the diameter of a core of a multi-mode optical fiber, because in a GaAs based light-emitting element, for instance, emitting light of about 850 nm wavelength, operating at 10 Gbps, the diameter of the light-emitting face can be established to be about 10 µm, so as to achieve a highly efficient utilization of light beams. In the case of a single-mode optical fiber, if the diameter of the light-emitting face is smaller than the diameter of a single-mode optical fiber, a problem such as that high-speed operation cannot be achieved due to an increase in the substrate temperature by operation may occur. Then, although the decrease in the utilization efficiency of light beams must be considered for the single-mode optical fiber, because the light-emitting face can not always be made smaller than the diameter of the core of the single-mode optical fiber, the diameter of the active regions can be selected to be several decade µm, anyway.

Figure 4A:
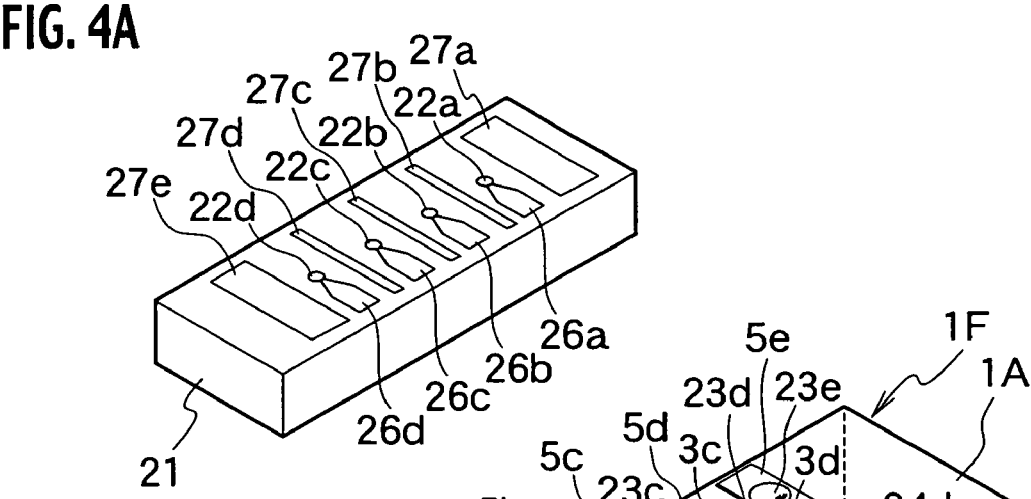
FIG. 4A is a schematic bird's-eye view of an optical device chip mounted on the holder according to the first embodiment of the present invention.

Though FIG. 4A shows a topology of each of the electric interconnections 26a, 26b, 26c, 26d, . . . implemented by a tapered portion and a constant width strip portion such that through the tapered portion, in which the width of each of the electric interconnections 26a, 26b, 26c, 26d, . . . gradually widens from the outer diameters of the active regions 22a, 22b, 22c, 22d, . . . , each of the active regions 22a, 22b, 22c, 22d, . . . is connected to the corresponding strip portion. The geometry and the topology of the electric interconnections 26a, 26b, 26c, 26d, . . . are not limited to the geometry and the topology shown in FIG. 4A.

In addition, the upper part of the electric interconnections 26a, 26b, 26c, 26d, . . . can be covered by a passivation film such as a silicon oxide film ($SiO_2$), a phosphosilicate glass (PSG) film, a boro-phosphate-silicate glass (BPSG) film, a silicon nitride ($Si_3N_4$) film or a polyimide film such that part of each of the upper part of the plurality of electric interconnections 26a, 26b, 26c, 26d, . . . is exposed through a window formed in the passivation film.

Although the electric interconnections 26a, 26b, 26c, 26d, . . . may be formed of an electrically conductive film such as a polysilicon film or a refractory metal film—"the refractory metal" may include tungsten (W), titanium (Ti), or molybdenum (Mo) film. It is preferable that the electric interconnections 26a, 26b, 26c, 26d, . . . are covered by a thin aluminum (Au) film laminated on the top surface of the electrically conductive film from the viewpoint of connection reliability.

Although an illustration is omitted, a second main electrode region of the light-emitting element is formed on the back side of the optical device chip 21 or an isolated area from the first main electrode region on the top surface of the optical device chip 21. The "second main electrode region" is the other of the anode and cathode electrode regions of the light-emitting elements. For example, if the first main electrode region is the anode electrode region, the second main electrode region is the cathode electrode region of the light-emitting element. As it will be appreciated, the terms the anode and cathode can be exchanged without modifying the structure itself. From the second main electrode region of the light-emitting element, an external interconnection is extracted to the outside of the optical device chip 21 by methods such as wire bonding and flip-chip bonding.

In FIG. 4A, three chip-site heat conduction passages 27b, 27c and 27d are alternately inserted in each space of the four electric interconnections 26a, 26b, 26c and 26d. In addition, two chip-site heat conduction passages 27a and 27e, which are wider than the three chip-site heat conduction passages 27b, 27c and 27d, are arranged in the outside of the electric interconnections 26a and 26d. Similar to the narrower chip-site heat conduction passages 27b, 27c and 27d, the wider chip-site heat conduction passages 27a and 27e are heat conduction passages and are delineated so as to keep a symmetrical topology of heat flow with the narrower heat conduction passages 27b, 27c and 27d located inside of the electric interconnections 26a to 26d, in the optical device chip 21 of the first embodiment.

The strip patterns of the chip-site heat conduction passages 27a, 27b, 27c, 27d, 27e, . . . can be formed of highly heat-conductive materials such as semiconductor thin films including amorphous Si and, poly-crystalline Si deposited by sputtering technique or CVD method. The strip patterns of the chip-site heat conduction passages 27a, 27b, 27c, 27d, 27e, . . . may be formed of ceramic thin films such as aluminum nitride (AlN) and insulating materials such as epoxy resin having a high thermal conductivity. These thin films are delineated to strip patterns so as to implement the chip-site heat conduction passages 27a, 27b, 27c, 27d, 27e, . . . Further, similar to the electric interconnections 26a, 26b, 26c, 26d, . . . , the chip-site heat conduction passages 27a, 27b, 27c, 27d, 27e, . . . may be formed, utilizing a metal mask, by sputtering metallic thin films such as copper (Cu) and aluminum (Al) etc. Especially, taking thermal conductivity into consideration, metallic materials such as copper (Cu), aluminum (Al) and silver (Ag), etc are preferable and a composite structure such as a copper (Cu) film coated by gold (Au) film may be used for the chip-site heat conduction passages 27a, 27b, 27c, 27d, 27e, . . . . When the chip-site heat conduction passages 27a, 27b, 27c, 27d, 27e, . . . have electric conductivity simultaneously, the chip-site heat conduction passages 27a, 27b, 27c, 27d, 27e, . . . can be used as ground lines so as to electrically isolate the electric interconnections 26a, 26b, 26c, 26d, . . . and also can be used as another side of anode electrodes and cathode electrodes.

Figure 4B:
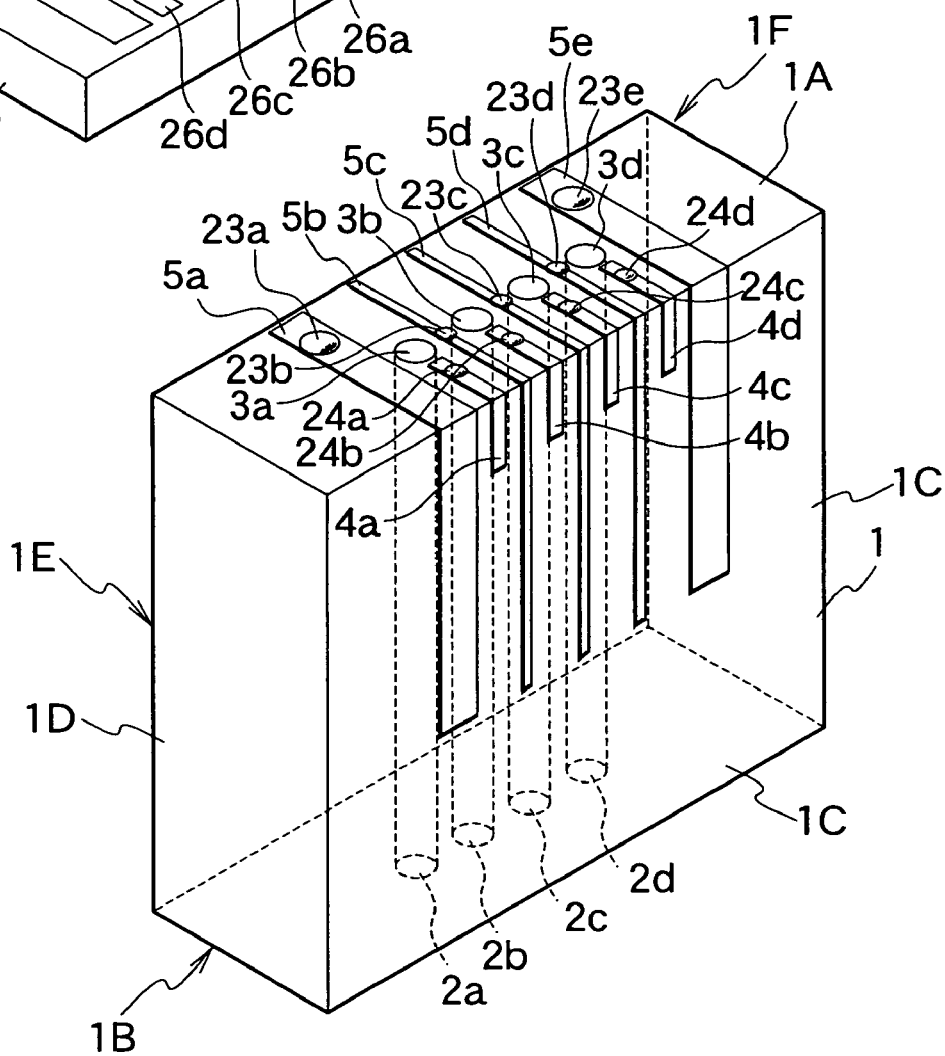
FIG. 4B is a schematic bird's-eye view explaining a configuration in which thermal joints (heat conductive bumps) and electric joints (electrical conductive bumps) are disposed on the holder according to the first embodiment of the present invention.

As shown in FIG. 4B, electric joints (electrical conductive bumps) 24a, 24b, 24c, 24d, . . . , which are necessary for connecting electrically between each of the electric interconnections 26a, 26b, 26c, 26d, . . . on the optical device chip 21 and the electric interconnections 4a, 4b, 4c, 4d, . . . on the holder 1, are disposed on the electric interconnections 4a, 4b, 4c, 4d, . . . respectively. For the material of the electric joints (electrical conductive bumps) 24a, 24b, 24c, 24d, . . . , solder balls, gold (Au) bumps, silver (Ag) bumps, copper (Cu) bumps, nickel-gold (Ni—Au) alloy bumps or nickel-gold-indium (Ni—Au—In) alloy bumps, etc. are acceptable. An eutectic solder having a composition ratio such as tin (Sn):lead (Pb)=6:4 with a diameter 10 μm to 25 μm, height 5 μm to 20 μm can be used for the solder ball. Or, eutectic solders having such composition ratios of Sn:Pb=5:95 and Sn:Au=2:8 may be used for the solder ball. Therefore, "the vicinities of the openings" from which the electric interconnections 4a, 4b, 4c and 4d extend will be so designed that the surrounding areas of the respective openings, or the respective adjoining area of the openings should lie within the order of the diameter of electric joints (electrical conductive bumps) 24a, 24b, 24c, 24d, . . . . Practically speaking, "the vicinities of the openings" may depend on a fabrication process by which the electric interconnections 26a, 26b, 26c, 26d, . . . are delineated on the optical device chip 21, because each of the electric interconnections 26a, 26b, 26c, 26d, . . . has a topology encompassing a tapered portion and a constant width strip portion as shown in FIG. 4A.

As shown in FIG. 4B, thermal joints (heat conductive bumps) 23a, 23b, 23c, 23d, 23e, . . . which are necessary for connecting thermally between each of the chip-site heat conduction passages 27a, 27b, 27c, 27d, 27e, . . . on the optical device chip 21 and each of the holding-member-site heat conduction passages 5a, 5b, 5c, 5d, 5e, . . . of the holder 1, are disposed on the holding-member-site heat conduction passages 5a, 5b, 5c, 5d, 5e, . . . . For the material of the thermal joints (heat conductive bumps) 23a, 23b, 23c, 23d, 23e, . . . , metallic bumps having a high thermal conductivity such as gold (Au) bumps, silver (Ag) bumps, copper (Cu) bumps, and highly heat-conductive materials such as epoxy resin paste etc. are acceptable and solder balls may also be used.

Figure 5A:
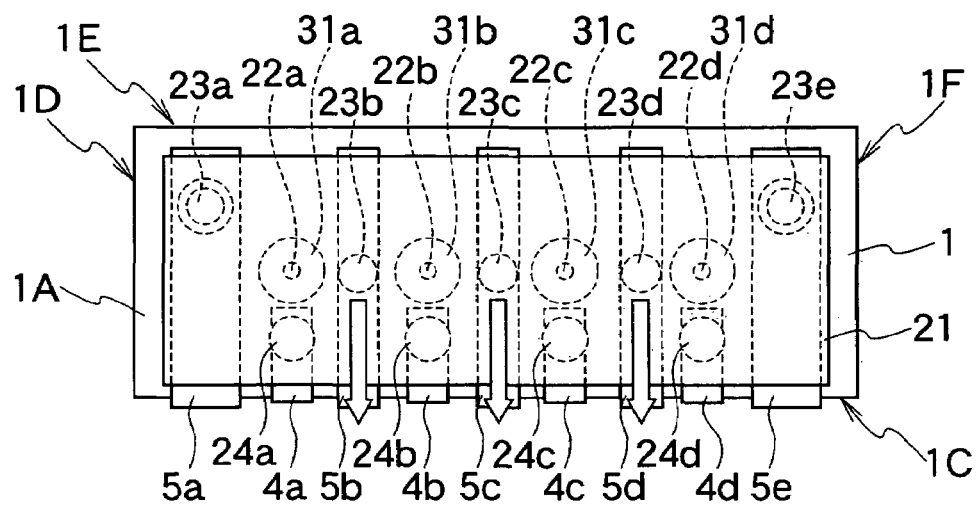
FIG. 5A is a perspective front view of the holder viewed from a mounting face according to the first embodiment.
Figure 5B:
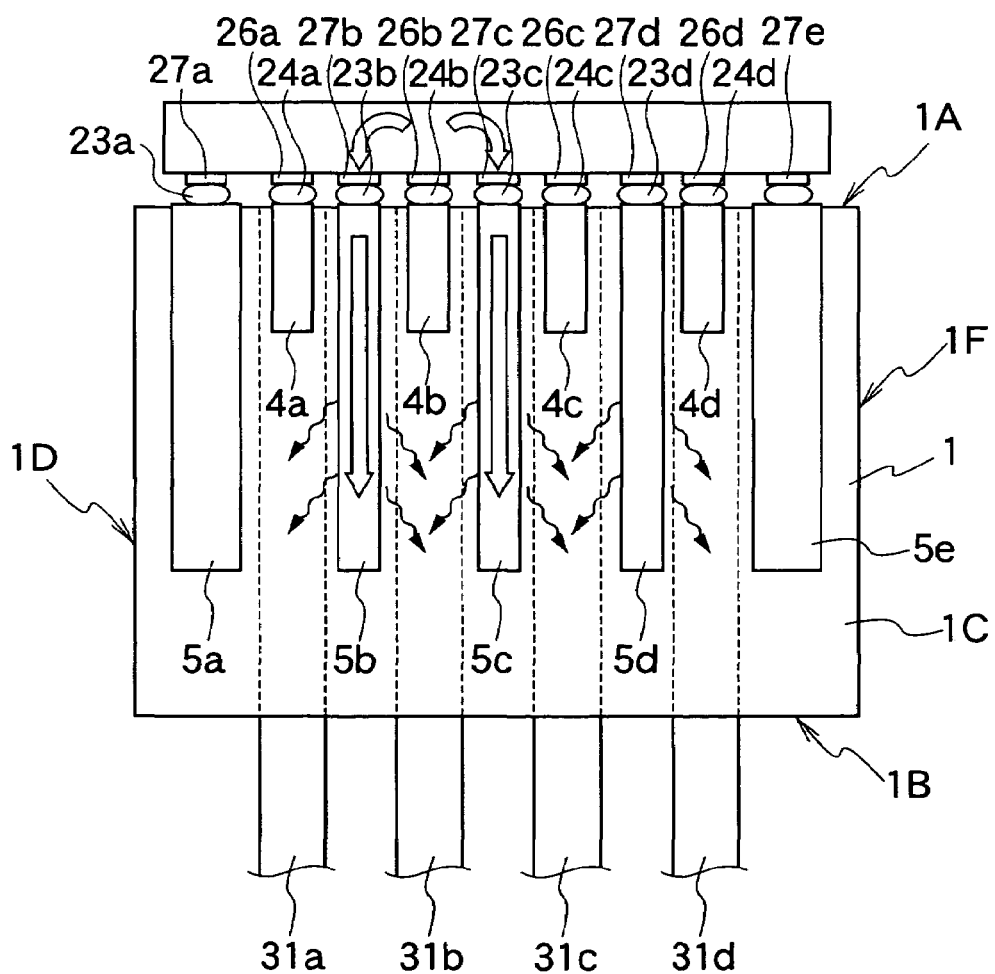
FIG. 5B is a plan view of the holder viewed from a first side face according to the first embodiment.

As shown in FIGS. 5A and 5B, the optical device chip 21 is mounted on the mounting face 1A of the holder 1 by a face down (flip-chip) configuration. Namely, the top surface of the optical device chip 21, in which the active regions 22a, 22b, 22c, 22d, . . . are merged, faces down on to the mounting face 1A of the holder 1. FIG. 5A is a perspective front view of the holder 1 viewed from the mounting face 1A and FIG. 5B is a plan view of the holder 1 viewed from the interconnection face (first side face) 1C. Though in the perspective front view of FIG. 5A, the active regions 22a, 22b, 22c, 22d, . . . are illustrated, the illustrations of the electric interconnections 26a, 26b, 26c, 26d, . . . and the chip-site heat conduction passages 27a, 27b, 27c, 27d, 27e, . . . on the optical device chip 21 are omitted for simplification.

By adopting a mounting method of the face down (flip-chip) configuration, each of the electric interconnections 26a, 26b, 26c, 26d, . . . on the optical device chip 21 are electrically connected to the electric interconnections 4a, 4b, 4c, 4d, . . . on the holder 1 by the electric joints (electrical conductive bumps) 24a, 24b, 24c, 24d, . . . respectively. And also each of the chip-site heat conduction passages 27a, 27b, 27c, 27d, 27e, . . . on the optical device chip 21 are thermally connected to the holding-member-site heat conduction passages 5a, 5b, 5c, 5d, 5e, . . . of the holder 1 by the thermal joints (heat conductive bumps) 23a, 23b, 23c, 23d, 23e, . . . respectively. By this configuration, input/output electric signals of the optical device chip 21 mounted on the mounting face 1A can be extracted to the outside at the interconnection face (first side face) 1C by the electric interconnections 4a, 4b, 4c, 4d, . . . , which extend from the mounting face 1A to the interconnection face (first side face) 1C.

As shown in FIGS. 5A and 5B, the holding-member-site heat conduction passages 5b, 5c and 5d are alternately inserted in to each space of the electric interconnections 4a, 4b, 4c, 4d, . . . , and are located in the locations between the openings 3a, 3b, 3c, 3d, . . . , namely in the locations between the active regions 22a, 22b, 22c, 22d, . . . . As shown in FIGS. 5A and 5B, heat which is generated in the active regions 22a, 22b, 22c, 22d, . . . diffuses along thermal flow passages shown by wide white (outlined) arrows, part of the heat is extracted to the holding-member-site heat conduction passages 5a, 5b, 5c, 5d, 5e, . . . through the thermal joints (heat conductive bumps) 23a, 23b, 23c, 23d, 23e, . . . before reaching the adjacent active regions 22a, 22b, 22c, 22d, . . . . Afterwards, as shown by black waved arrows, the heat is radiated into the air from the holding-member-site heat conduction passages 5a, 5b, 5c, 5d, 5e, . . . , which extend longer than the length of the electric interconnections 4a, 4b, 4c, 4d, . . . in the interconnection face (first side face) 1C. As shown in FIG. 5B, the wider holding-member-site heat conduction passages 5a and 5e, located on the outer side of the holding-member-site heat conduction passages 5b, 5c and 5d, implement a symmetrical heat flow from the inside active regions 22b, 22c and the outside active regions 22a, 22d arranged in the optical device chip 21.

For the materials of the heat conduction passages and the thermal joints, materials having a similar or higher thermal conductivity than the optical device chip, are effective. For instance, gallium arsenide (GaAs), Indium phosphide (InP), gallium nitride (GaN) can be used as a substrate material of the optical device chip, and the thermal conductivities are about 50 W/m/K, 70 W/m/K and 130 W/m/K, respectively. Therefore, such materials as CVD diamond (about 2000 W/m/K) and aluminum (Al: about 240 W/m/K) etc. are sufficiently suitable for the heat conduction passages and the thermal joints.

FIGS. 1 to 5 illustrate the case in which the heat conduction passages are longer than the electric interconnections on the mounting face 1A and also on the interconnection face (first side face) 1C. However, even in the case where the heat conduction passages are longer than the electric interconnections, only on one of the mounting face 1A and the interconnection face (first side face) 1C, similar thermal transport and similar effectiveness to the case shown in FIGS. 1 to 5 can be ensured.

First Modification of the First Embodiment

Figure 6:
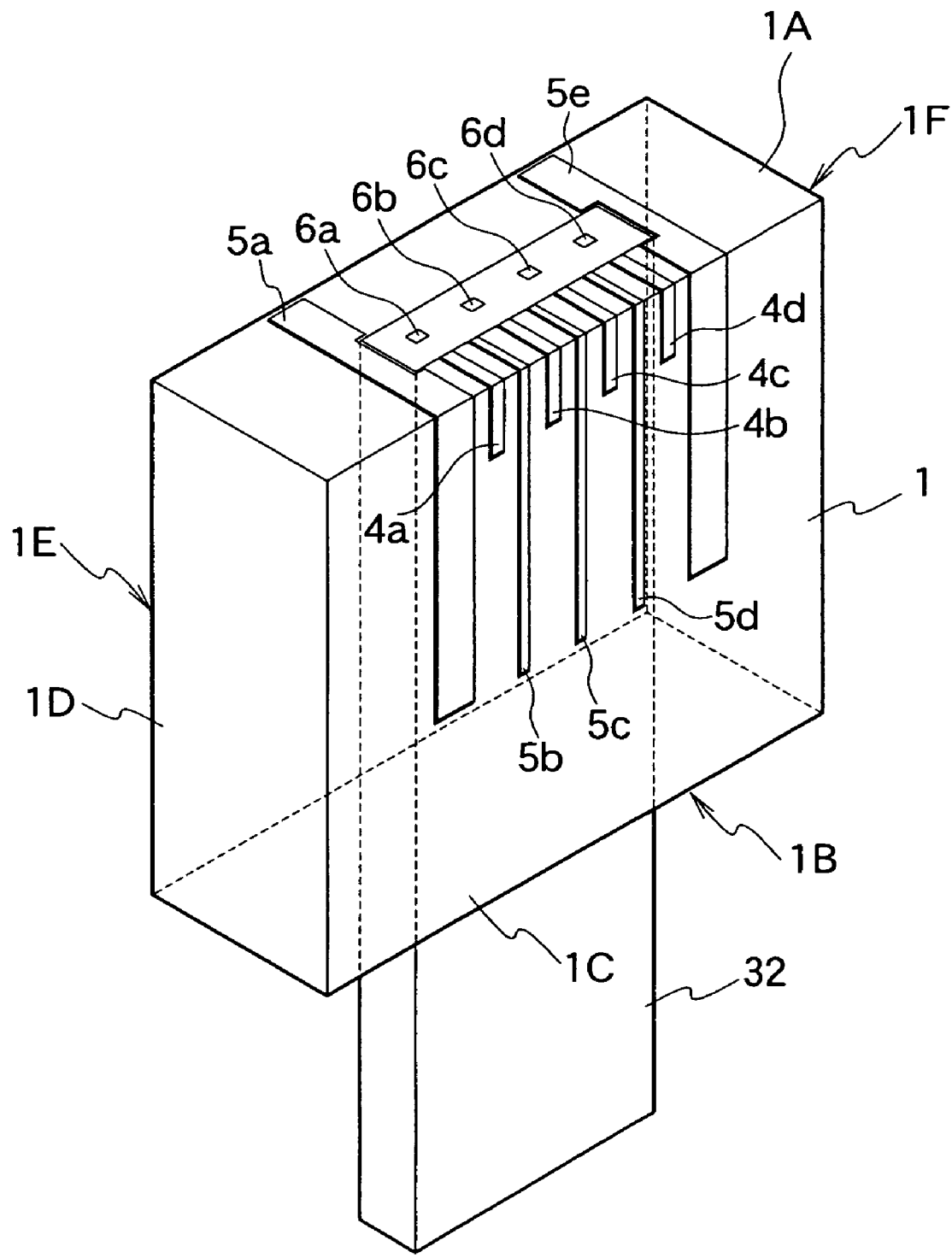
FIG. 6 is a schematic bird's-eye view showing an assembled configuration of a holder according to a modification (a first modification) of the first embodiment of the present invention, in which an optical wave-guiding film (multi-core optical wave-guide) is held as an optical transmission line.

FIG. 6 shows an assembled configuration of a holder 1 according to a modification (a first modification) of the first embodiment of the present invention, in which an optical wave-guiding film (multi-core optical wave-guide) 32 is used as the optical transmission lines. The holder 1 shown in FIG. 6 can implement a similar optical semiconductor module as shown in FIGS. 5A and 5B, by mounting the optical device chip 21 shown in FIG. 4A on the mounting face 1A of the holder 1.

Contrary to the configuration shown in FIG. 1, in which the cylindrical through-holes (holding sleeves) 2a, 2b, 2c, 2d, . . . penetrate the insulating base body 1 between the mounting face 1A and the opposing face 1B so as to mechanically hold a plurality of optical transmission lines, the holder 1 according to the modification (the first modification) of the first embodiment of the present invention has a single rectangular through-hole (holding sleeve) penetrating the insulating base body 1, so that a single rectangular through-hole can be held, penetrating between the mounting face 1A and the opposing face 1B.

Namely as shown in FIG. 6, the holder 1 according to the first modification of the first embodiment of the present invention encompasses an insulating base body 1, a plurality of electric interconnections 4a, 4b, 4c, 4d and a plurality of heat conduction passages 5a, 5b, 5c, 5d, 5e. The geometry of the insulating base body 1 is defined by a mounting face 1A configured to mount an optical device chip 21, an opposing face 1B opposing to the mounting face 1A, a first side face (interconnection face) 1C, a second side face 1D, a bonding face (third side face) 1E and a fourth side face 1F. The interconnection face (first side face) 1C, the second side face 1D, the bonding face (third side face) 1E and the fourth side face 1F are connected between the mounting face 1A and the opposing face 1B. The electric interconnections 4a, 4b, 4c and 4d are delineated in parallel from the mounting face 1A to the interconnection face (first side face) 1C. On the mounting face 1A, the electric interconnections 4a, 4b, 4c and 4d extend from the vicinity of a single rectangular opening face, which is formed by intersecting the mounting face 1A by a single rectangular sleeve penetrating between the mounting face 1A and the opposing face 1B so as to mechanically hold the optical wave-guiding film (multi-core optical wave-guide) 32. The heat conduction passages (heat conduction strips) 5a, 5b, 5c, 5d and 5e are delineated alternately with the electric interconnections 4a, 4b, 4c and 4d, extending from the mounting face 1A to the interconnection face (first side face) 1C. Each of the heat conduction passages 5a, 5b, 5c, 5d and 5e has a length on the interconnection face (first side face) 1C longer than the length of the electric interconnections 4a, 4b, 4c and 4d. Though four rectangular cores 6a, 6b, 6c and 6d are illustrated in the optical wave-guiding film (multi-core optical wave-guide) 32, the geometry and the number of cores is not limited to the geometry and the number shown in FIG. 6. Contrary to the configuration shown in FIG. 1, in which the length of the heat conduction passages (heat conduction strips) 5a, 5b, 5c, 5d and 5e, delineated in parallel and alternately between openings 3a, 3b, 3c, 3d, . . . , is longer than the length of the electric interconnections 4a to 4d; in the configuration of FIG. 6, the length of three narrower heat conduction passages 5b, 5c and 5d, located inside of the electric interconnections 4a to 4d is substantially the same as the length of the electric interconnections 4a to 4d. However, as shown in FIG. 6, the length of the two outer wider conduction passages 5a and 5e is longer than the length of the electric interconnections 4a, 4b, 4c and 4d at the mounting face 1A, because the wider conduction passages 5a and 5e extend from the interconnection face (first side face) 1C to the bonding face (third side face) 1E on the mounting face 1A.

In the optical module using the holder 1 according to the first modification of the first embodiment of the present invention, the single rectangular through-hole established in the insulating base substrate 1 can facilitate alignment of the position of the rectangular cores 6a, 6b, 6c and 6d in the optical wave-guiding film (multi-core optical wave-guide) 32 to the location of the active regions 22a, 22b, 22c and 22d shown in FIG. 4A, with high-accuracy.

The optical wave-guiding film (multi-core optical wave-guide) 32 can be formed of UV hardened epoxy resin and polyimide resin, fluoridation polyimide resin, etc.

The optical module using the holder 1 according to the first modification of the first embodiment of the present invention shown in FIG. 6 can achieve the similar thermal flow, which is illustrated by wide white arrows and waved black arrows in FIGS. 5A and 5B such that an increase in effective heat resistance between the active regions 22a, 22b, 22c, 22d, . . . can suppress thermal interference between the active regions 22a, 22b, 22c, 22d, . . . . In other words, by inserting the heat conduction passages 5b, 5c and 5d according to the first modification of the first embodiment, which are located inside of the electric interconnections 4a to 4d on the optical device chip 21, the thermal interference between each of the active regions 22a, 22b, 22c, 22d, . . . can be suppressed.

Second Modification of the First Embodiment

Figure 7A:
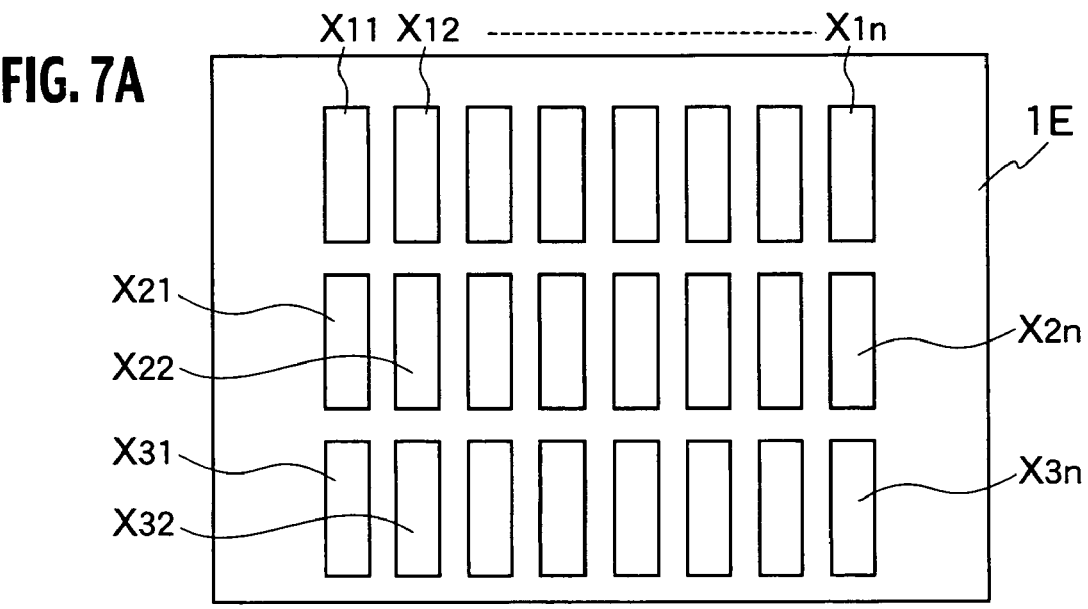
FIG. 7A is a plan view illustrating a third side face, which may be assigned as a back surface of the holder according to another modification (second modification) of the first embodiment of the present invention.
Figure 7B:
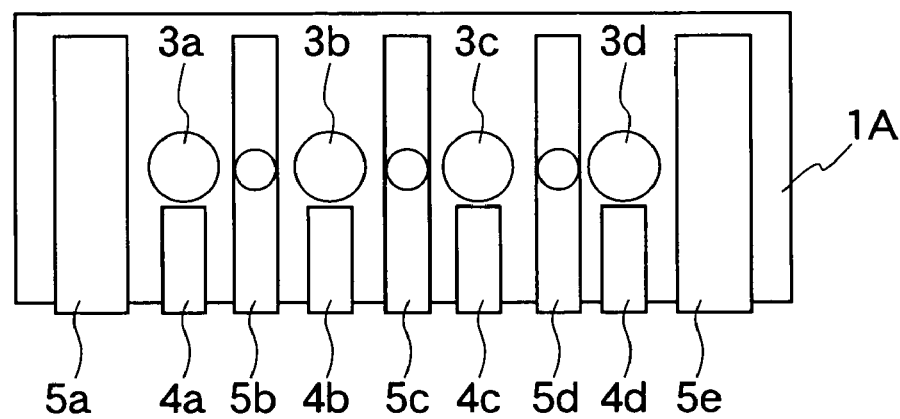
FIG. 7B is a front view illustrating a mounting face of the holder according to the second modification of the first embodiment.
Figure 7C:
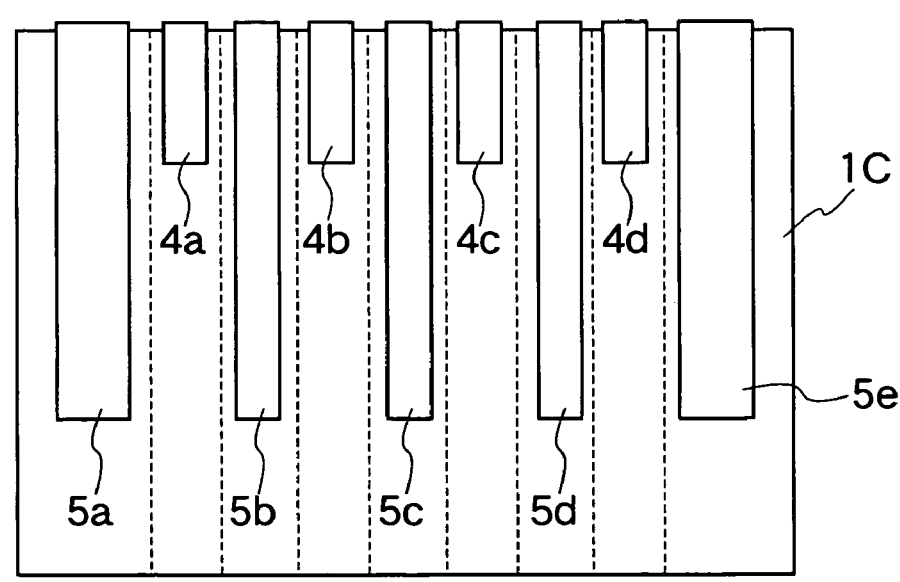
FIG. 7C is a plan view illustrating a first side face of the holder according to the second modification of the first embodiment.

In the description associated with FIG. 1, a topology of the electric interconnections 4a, 4b, 4c, 4d, . . . and the heat conduction passages 5a, 5b, 5c, 5d, 5e, . . . at the mounting face 1A, and a topology in which the electric interconnections 4a, 4b, 4c, 4d, . . . and the heat conduction passages 5a, 5b, 5c, 5d, 5e, . . . are delineated from the mounting face 1A so as to be extended to the interconnection face (first side face) 1C are mainly discussed, and an explanation as to a pattern and a topology on the bonding face (third side face) 1E opposing to the interconnection face (first side face) 1C is omitted. Therefore, as shown in FIG. 7A, in the holder 1 according to another modification (second modification) of the first embodiment of the present invention, the pattern and the topology of the bonding face (third side face) 1E is explained. FIG. 7A is a plan view illustrating the bonding face (third side face) 1E, which may correspond to a back surface of the holder 1. FIG. 7B is a front view illustrating the mounting face 1A and FIG. 7C is a plan view illustrating the interconnection face (first side face) 1C. Since the illustrations of FIGS. 7B and 7C are similar to the configurations shown in FIG. 1, overlapped explanations are omitted.

The third side face 1E opposing to the interconnection face (first side face) 1C is used as a bonding face (bonding plane) for bonding the holder 1 on to a packaging substrate, etc. In the bonding process of the holder 1, if a single, wide piece of metallic film is formed over almost the entire face of the bonding face (third side face) 1E of the insulating base body 1 which is made of a resin etc, a warp of the metallic film, or destruction of the metallic film, according to the level of warping, may be caused by a difference in the linear thermal expansion coefficient between the metallic film and the resin implementing the insulating base body 1. Therefore, in the second modification of the first embodiment, as shown in FIG. 7A, a plurality of rectangular metallic patterns (short strip patterns) $X_{ij}$ (i=1–3; j=1–n) are delineated on the bonding face (third side face) 1E, for bonding the holder 1 on to the packaging substrate, in a matrix configuration. As shown in FIG. 7A, by forming the divided metallic patterns $X_{ij}$ on the bonding face (third side face) 1E in a matrix of short strips, the absolute value of the stress due to the difference in the linear thermal expansion coefficient in the metallic patterns $X_{ij}$ can be decreased and the possibility of the warp of the metallic patterns $X_{ij}$, or the destruction of the metallic patterns $X_{ij}$ according to the level of warping after the bonding process can be reduced, even if the insulating base body 1 is made of resin etc. And of course the geometry and the topology of the metallic patterns $X_{ij}$ are not limited to the rectangular short strip configuration shown in FIG. 7A, and other topologies such as the arrangement of the metallic patterns $X_{ij}$ of hexagon geometry in a honeycomb configuration etc. can achieve similar effectiveness.

Third Modification of the First Embodiment

Figure 2:
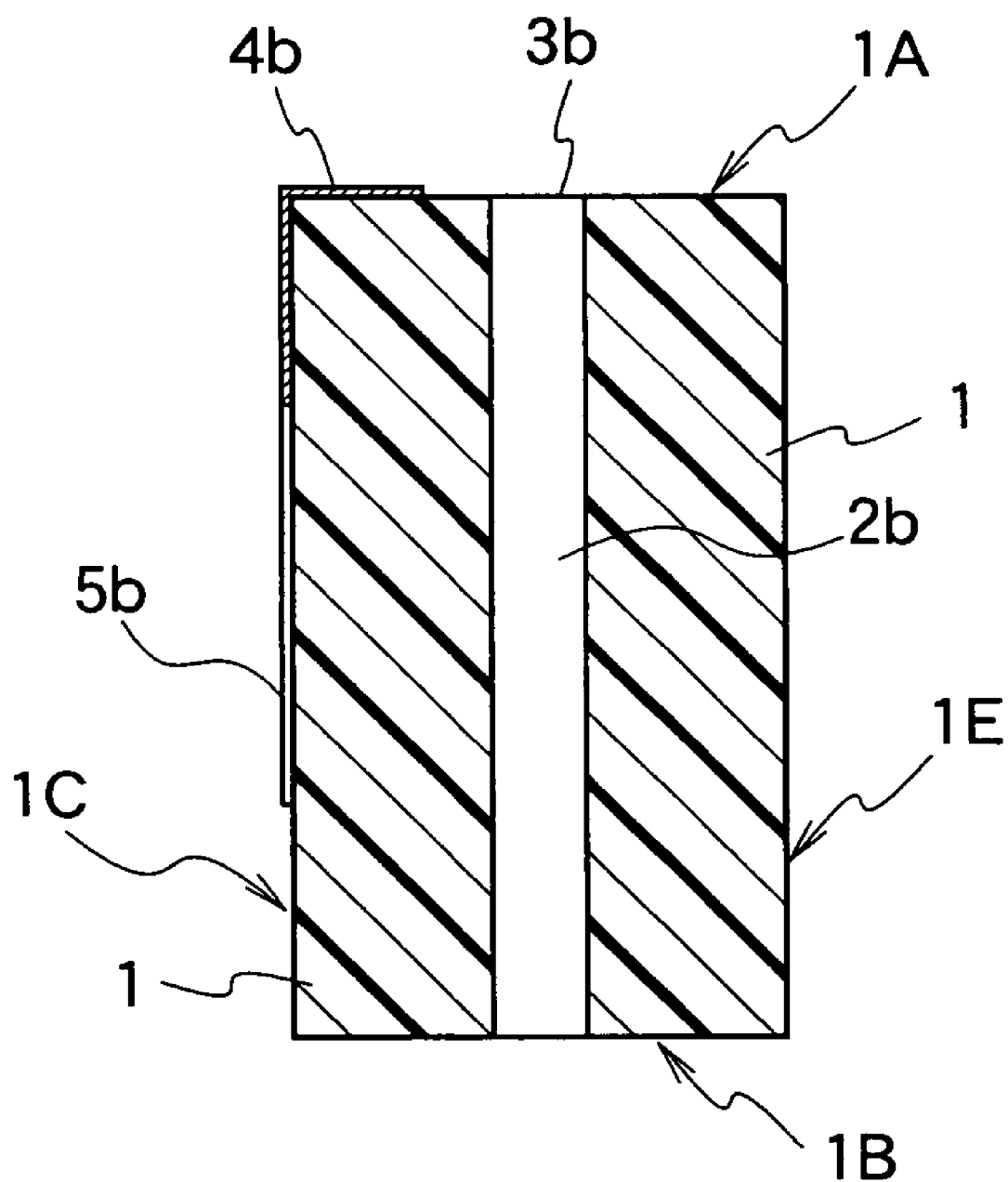
FIG. 2 is a cross-sectional view of the holder taken on plane S in FIG. 1.
Figure 3:
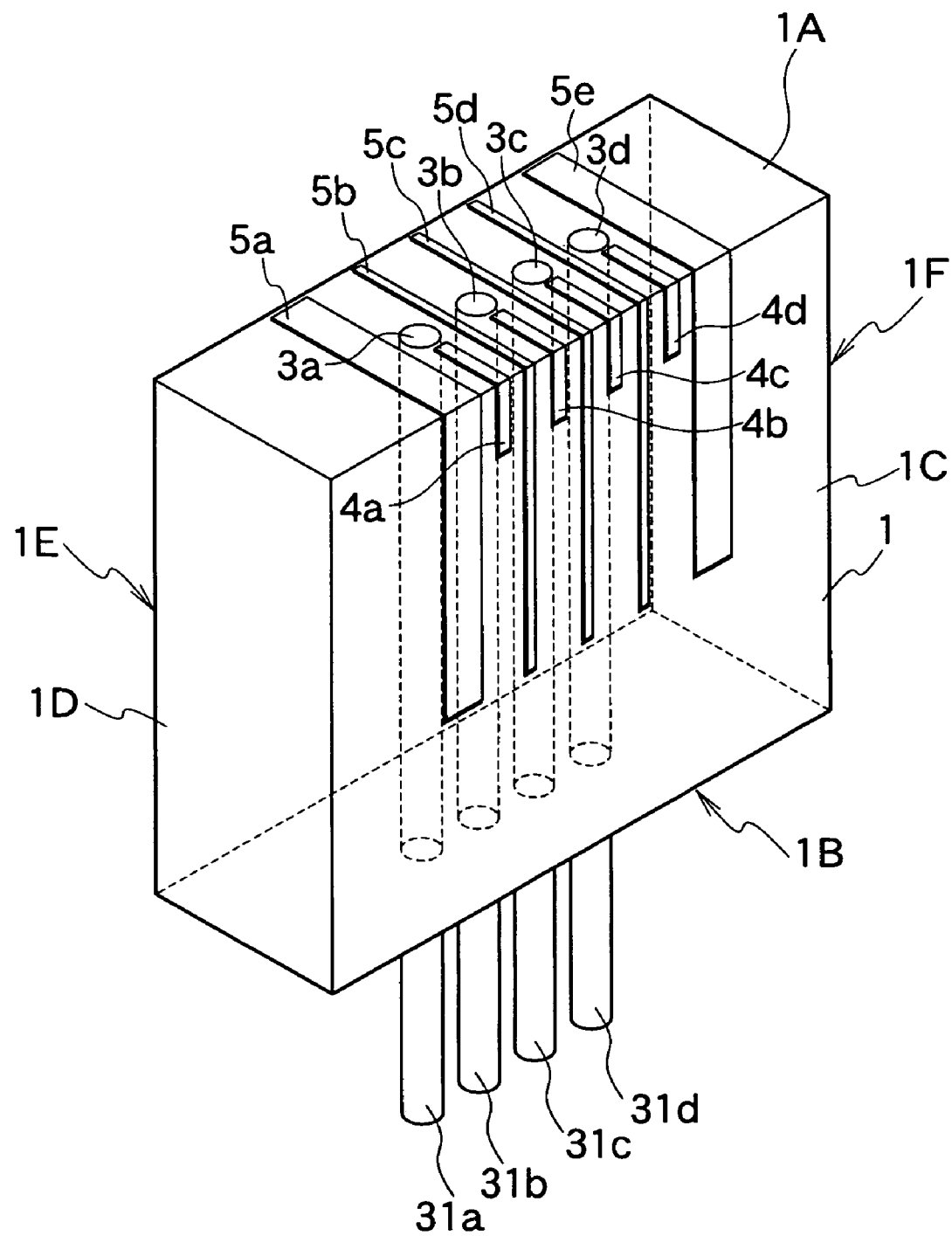
FIG. 3 is a schematic bird's-eye view showing a plurality of optical fibers which are held in the holder according to the first embodiment shown in FIG. 1.
Figure 8:
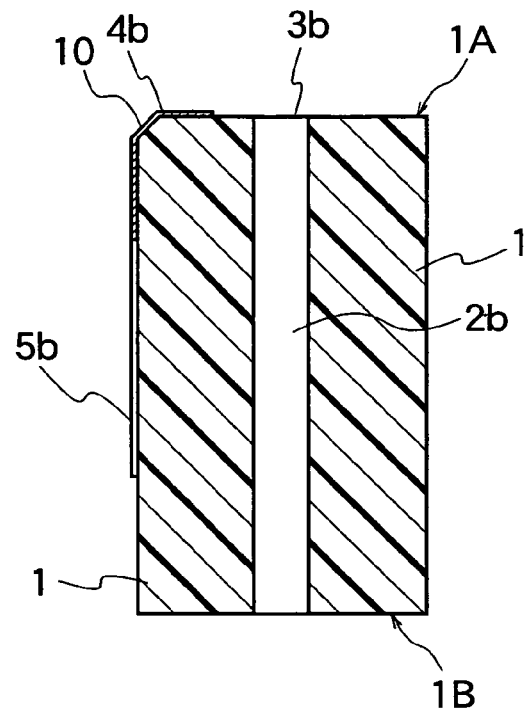
FIG. 8 is a cross-sectional view showing a schematic configuration of a holder according to still another modification (third modification) of the first embodiment.

FIG. 8 is a cross-sectional view showing a schematic configuration of the holder 1 according to still another modification (third modification) of the first embodiment. Similar to the cross-sectional configuration shown in FIG. 2, FIG. 8 shows a cross-sectional view of the holder 1 taken on plane S, along a direction in which the through-hole 2b extends in FIG. 1. As shown in the cross-sectional view of FIG. 8, a chamfer 10 is established at the intersectional corner between the mounting face 1A and the interconnection face (first side face) 1C. And the electric interconnection 4b extends on the surfaces of the base body 1, covering over to the interconnection face (first side face) 1C from the mounting face 1A through the chamfer 10. At the rear side of the electric interconnect 4b, the heat conduction passage 5b also extends to the interconnection face (first side face) 1C from the mounting face 1A. Though illustrations are omitted, the other electric interconnects 4a, 4c, 4d and the other heat conduction passages 5a, 5c, 5d, 5e also extend on the surfaces of the base body 1 to the interconnection face (first side face) 1C from the mounting face 1A through the chamfer 10. By providing the chamfer 10 at the intersectional corner between the mounting face 1A and the interconnection face (first side face) 1C, break failures in the electric interconnections 4a, 4b, 4c, 4d, . . . and the holder-site heat conduction passages 5a, 5b, 5c, 5d, 5e, . . . at the intersectional corner between the mounting face 1A and the interconnection face (first side face) 1C can be prevented so as to facilitate the metallization process.

Fourth Modification of the First Embodiment

Figure 9:
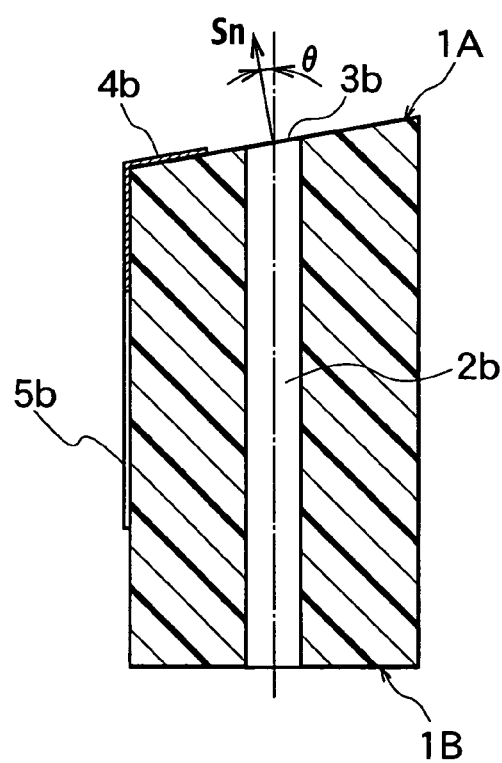
FIG. 9 is a cross-sectional view showing a schematic configuration of a holder according to yet still another modification (fourth modification) of the first embodiment.

FIG. 9 is a cross-sectional view showing a schematic configuration of the holder 1 according to yet still another modification (fourth modification) of the first embodiment. FIG. 9 shows a cross-sectional view of the holder 1 taken on plane S, along a direction in which the through-hole 2b extends in FIG. 1. In the fourth modification of the first embodiment, as shown in FIG. 9, a normal direction Sn of the mounting face 1A of the holder 1, declines slightly toward an axial direction of the through-holes 2a, 2b, 2c, 2d, . . . .

As shown in FIG. 9, an angle between the normal direction Sn of the mounting face 1A and the axial direction of the through-holes 2a, 2b, 2c, 2d, . . . is taken as θ. A declining of the mounting face 1A by about θ=4–10° can prevent the incident light beams transmitted through the optical transmission lines such as optical fibers 31a, 31b, 31c, 31d, . . . from becoming returning light beams by the reflection on the surfaces of active regions of the optical device chip, which are disposed at the openings 3a, 3b, 3c and 3d.

Fifth Modification of the First Embodiment

Figure 10:
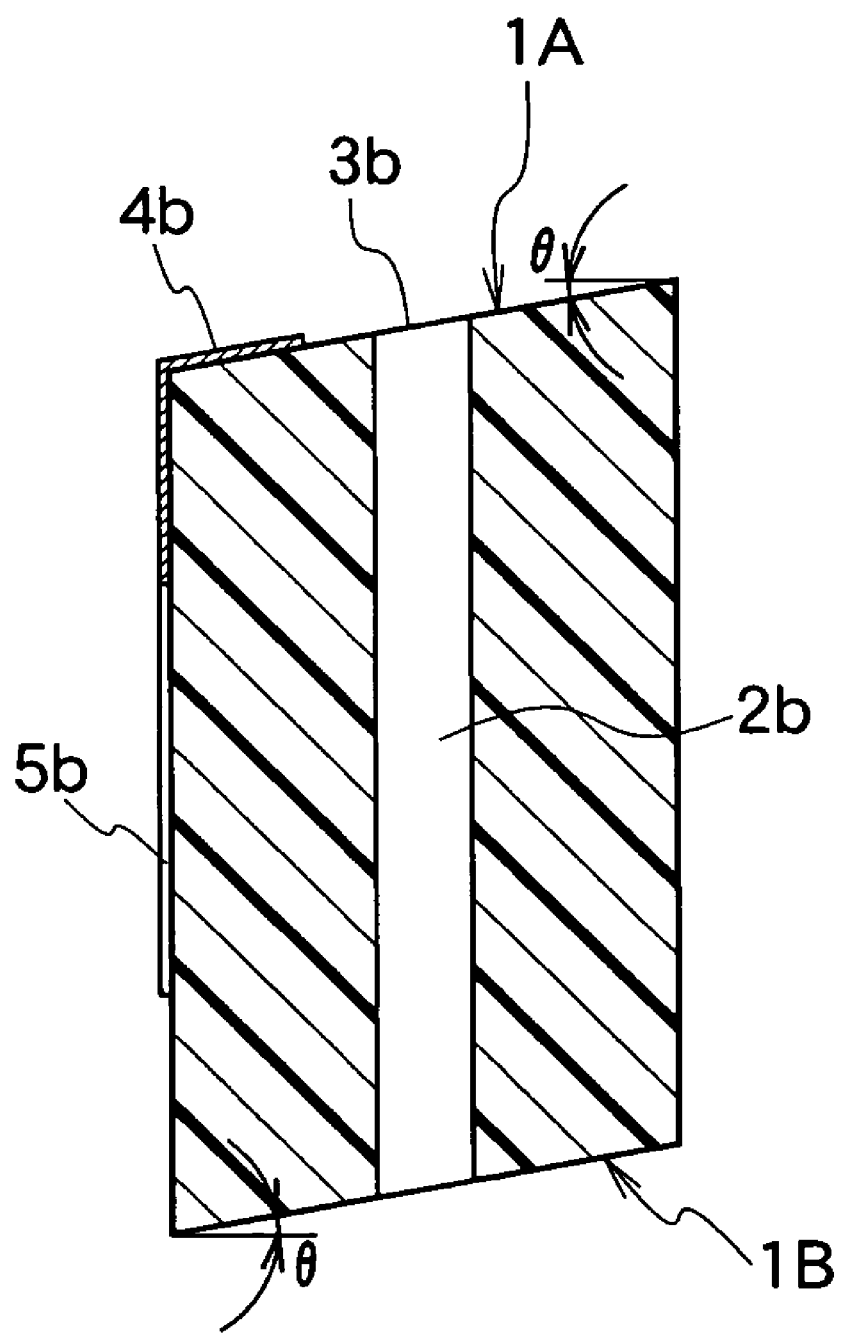
FIG. 10 is a cross-sectional view showing a schematic configuration of a holder according to yet still another modification (fifth modification) of the first embodiment.

FIG. 10 is a cross-sectional view showing a schematic configuration of the holder 1 according to yet still another modification (fifth modification) of the first embodiment. FIG. 10 shows a cross-sectional view of the holder 1 taken on plane S, along a direction in which the through-hole 2b extends in FIG. 1. In the fifth modification of the first embodiment, as shown in FIG. 10, not only a normal direction Sn of the mounting face 1A of the holder 1, declines slightly toward an axial direction of the through-holes 2a, 2b, 2c, 2d, . . . , but also the normal direction of the opposing face 1B declines against an axial direction of the through-holes 2a, 2b, 2c, 2d, . . . such that the opposing face 1B can be orientated in parallel with the mounting face 1A.

When the optical device chip 21 is mounted on the holder 1 so as to assemble the optical semiconductor module of the first embodiment, a weighting direction along which the optical device chip 21 is mounted on the holder 1 is aligned to the normal direction of the mounting face 1A. In the assembly process, as shown in FIG. 10, when the opposing face 1B of the holder 1 is orientated in parallel with the mounting face 1A, an angle which the mounting face 1A makes toward the weighting direction along which the optical device chip 21 is mounted can be easily defined using the opposing face 1B as a reference plane, which can facilitate the assembly process.

SECOND EMBODIMENT

Figure 11:
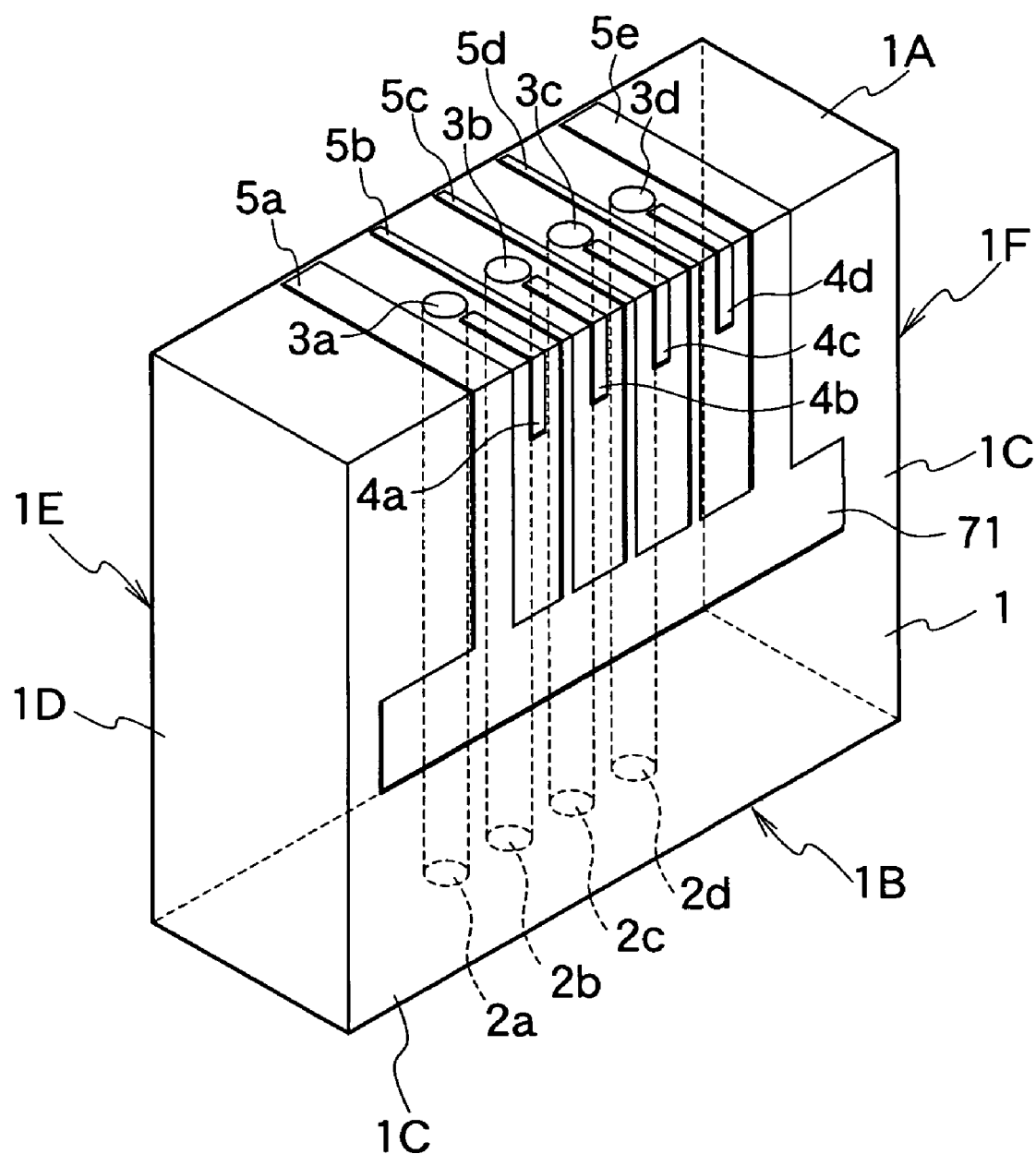
FIG. 11 is a schematic bird's-eye view showing a holder according to a second embodiment of the present invention.

As shown in FIG. 11, a holder 1 according to a second embodiment of the present invention, is similar to the holder 1 according to the first embodiment in that the holder 1 according to the second embodiment of the present invention encompasses an insulating base body 1, which is defined by a mounting face 1A configured to mount an optical device chip, an opposing face 1B opposing to the mounting face 1A and four first side faces connected between the mounting face 1A and the opposing face 1B. The four first side faces are assigned as a first side face (interconnection face) 1C, a second side face 1D, a third side face (bonding face) 1E and a fourth side face 1F. A plurality of cylindrical through-holes 2a, 2b, 2c, 2d, . . . penetrate between the mounting face 1A and the opposing face 1B so as to mechanically hold a plurality of optical transmission lines. A plurality of openings 3a, 3b, 3c, 3d, . . . are defined so that the cylindrical through-holes 2a, 2b, 2c, 2d, . . . intersect the mounting face 1A. The holder 1 of the second embodiment further encompasses a plurality of electric interconnections 4a, 4b, 4c, 4d, . . . , which are delineated in parallel, on the mounting face 1A and the interconnection face (first side face) 1C. Each of the strip patterns of the electric interconnections 4a, 4b, 4c, 4d, . . . starts from the vicinity of corresponding openings 3a, 3b, 3c, 3d, . . . so as to extend from the mounting face 1A to the interconnection face (first side face) 1C. The holder 1 of the second embodiment further encompasses a plurality of heat conduction passages (heat conduction strips) 5a, 5b, 5c, 5d, . . . which are delineated in parallel, alternately with the electric interconnections 4a, 4b, 4c, 4d, . . . on the mounting face 1A and the interconnection face (first side face) 1C. Namely, the mounting face 1A, the heat conduction passages (heat conduction strips) 5a, 5b, 5c, 5d, . . . are disposed on the locations between the openings 3a, 3b, 3c, 3d, . . . , and extend to the interconnection face (first side face) 1C from the mounting face 1A.

However, in the holder 1 of the second embodiment, all of the heat conduction passages (heat conduction strips) 5a, 5b, 5c, 5d, . . . are thermally short-circuited by a thermally short-circuiting member (heat radiation pad) 71, which is merged with the heat conduction passages (heat conduction strips) 5a, 5b, 5c, 5d, . . . so as to form a comb configuration on the interconnection face (first side face) 1C, as shown in FIG. 11. The heat conduction passages 5a, 5b, 5c, 5d, . . . of the second embodiment are similar to the heat conduction passages 5a, 5b, 5c, 5d, . . . of the first embodiment in that the lengths of the heat conduction passages 5a, 5b, 5c, 5d, . . . are longer than the corresponding lengths of the electric interconnections 4a, 4b, 4c, 4d, . . . both on the mounting face 1A and the interconnection face (first side face) 1C. In addition, as shown in FIG. 11, the supplementary heat conduction passages 5a and 5e disposed outside of and sandwiching the inner electric interconnections 4a, 4b, 4c and 4d, are also thermally short-circuited by the thermally short-circuiting member (heat radiation pad) 71 so as to accomplish the comb configuration.

Though illustrations are omitted, similar to the configurations shown in FIGS. 5A and 5B, the holder 1 of the second embodiment is configured to mount directly on an optical device chip 21 with ease, in which a plurality of optical semiconductor elements are monolithically integrated, similar to the first embodiment. The holder 1 of the second embodiment can suppress thermal interference between each of the active regions 22a, 22b, 22c, 22d, . . . , which are integrated in the optical device chip 21 so as to implement optical semiconductor elements. Therefore, an optical semiconductor module facilitating a direct optical coupling architecture at a very low-cost can be achieved with a high thermal reliability. As a result, even though a configuration and a topology in which a plurality of optical semiconductor elements are integrated in a single optical device chip with high-packing density, an optical semiconductor module with a very low-cost and highly reliable performance can be provided. Especially, since with such a topology as the one shown in FIG. 11, in which the thermally short-circuiting member (heat radiation pad) 71 forms a comb configuration with the holder-site heat conduction passages 5a, 5b, 5c, 5d, 5e, . . . , can increase the effective surface areas of the holder-site heat conduction passages 5a, 5b, 5c, 5d, 5e, . . . , and it is possible to significantly increase the radiation efficiency. Therefore, the holder 1 of the second embodiment can suppress thermal interference of the active regions 22a, 22b, 22c, 22d, . . . further than the holder 1 of the first embodiment.

The holder-site heat conduction passages 5a, 5b, 5c, 5d, 5e, . . . and the thermally short-circuiting member (heat radiation pad) 71 are formed of highly heat-conductive materials such as semiconductor thin films including polycrystalline Si, etc, ceramic thin films such as aluminum nitride (AlN) and insulating materials such as epoxy resin having a high thermal conductivity. The comb configuration in which ends of the holder-site heat conduction passages 5a, 5b, 5c, 5d, 5e, . . . are short-circuited by the thermally short-circuiting member (heat radiation pad) 71, can be delineated by a photolithography method and a reactive ion etching (RIE) method, after a highly heat-conductive material such as a semiconductor thin film is deposited on the interconnection face (first side face) 1C by sputtering technique or CVD method The comb configuration can also be delineated by metallization processes with a metal mask, through which the highly heat-conductive material is deposited selectively on the interconnection face (first side face) 1C. Similarly, the patterns of the electric interconnections 4a, 4b, 4c, 4d, . . . can be delineated by a photolithography method and a reactive ion etching (RIE) method, or alternatively can be deposited selectively by using a metal mask.

The holder-site heat conduction passages 5a, 5b, 5c, 5d, 5e, . . . can be made of metallic materials such as copper (Cu), aluminum (Al) and silver (Ag), etc. and a composite structure such as a copper (Cu) film coated by gold (Au) film may be used for the holder-site heat conduction passages 5a, 5b, 5c, 5d, 5e, . . . . When the comb configuration in which ends of the holder-site heat conduction passages 5a, 5b, 5c, 5d, 5e, . . . are short-circuited by the thermally short-circuiting member (heat radiation pad) 71, and are made from these metallic materials, because each strip of the comb configuration has electric conductivity simultaneously, the strips can be used as ground lines so as to electrically isolate the electric interconnections 4a, 4b, 4c, 4d, . . . . Then, in this case, the holder-site heat conduction passages 5a, 5b, 5c, 5d, 5e, . . . and the thermally short-circuiting member (heat radiation pad) 71 can be delineated simultaneously with the electric interconnections 4a, 4b, 4c, 4d, . . .

Especially, when the comb configuration in which ends of the holder-site heat conduction passages 5a, 5b, 5c, 5d, 5e, . . . are short-circuited by the thermally short-circuiting member (heat radiation pad) 71 and are made from these metallic materials, the potential of each of the holder-site heat conduction passages 5a, 5b, 5c, 5d, 5e, . . . can be kept fixed. Therefore, the electrical isolation between the electric interconnects 4a, 4b, 4c, 4d, . . . can be ensured further by connecting the holder-site heat conduction passages 5a, 5b, 5c, 5d, 5e, . . . to a ground line or to an external power supply, and thereby crosstalk noise between the electric interconnects 4a, 4b, 4c, 4d, . . . can be suppressed.

Modification of the Second Embodiment

Figure 12:
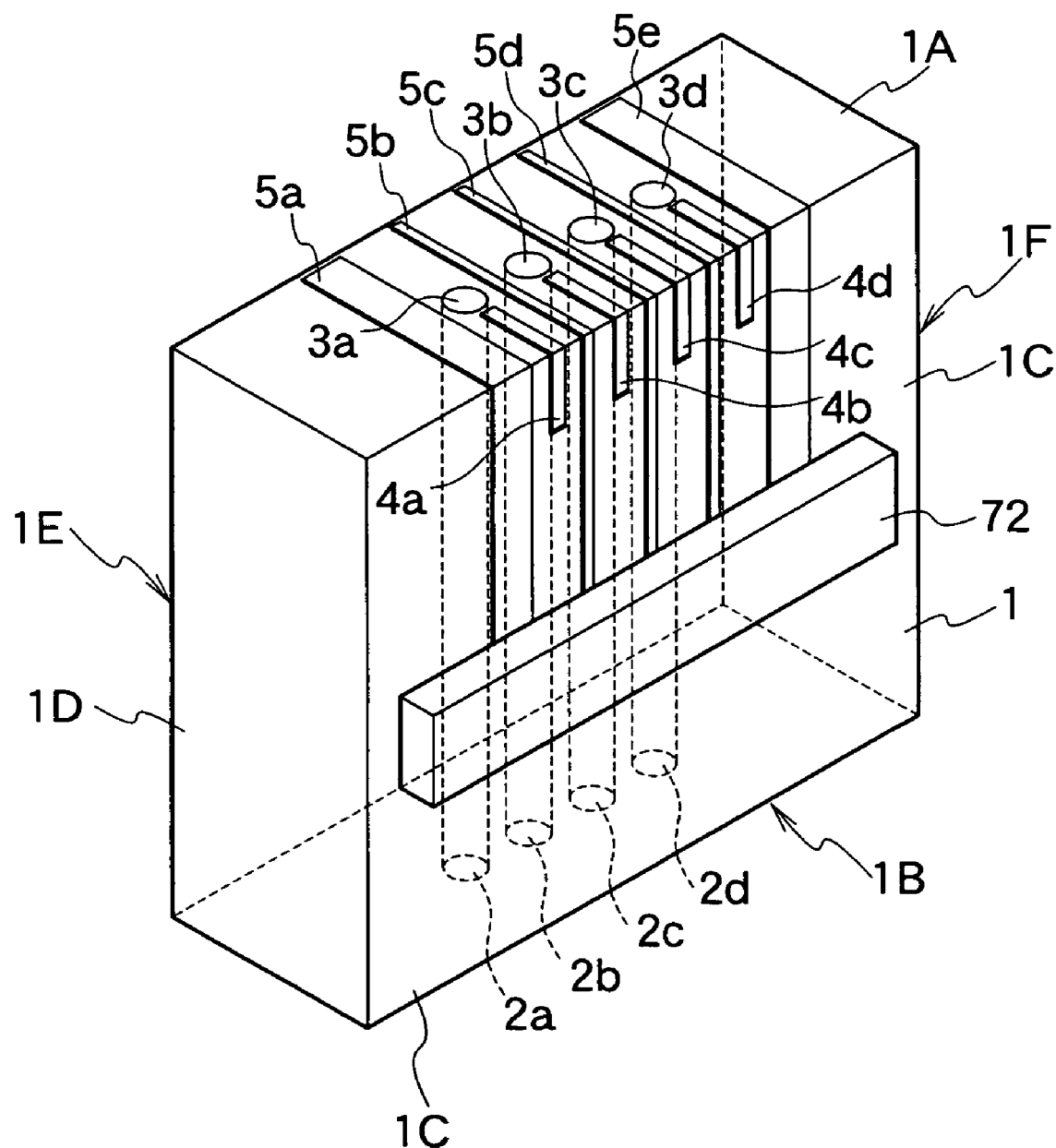
FIG. 12 is a schematic bird's-eye view showing a holder according to a modification of the second embodiment.

As shown in FIG. 12, all of the holder-site heat conduction passages 5a, 5b, 5c, 5d, 5e, . . . can be thermally short-circuited by a second thermally short-circuiting member (heat radiation member) 72 such as a heat spreader and radiating fins, etc. As an example of the heat spreader, a chip, a rectangular parallelepiped bar or a strip-shaped slab that is formed of highly heat-conductive materials such as Si etc. can be adopted.

The second thermally short-circuiting member (heat radiation member) 72 is thermally connected on to the comb configuration of the first thermally short-circuiting member (heat radiation pad) 71 as shown in FIG. 11 by using solder balls and bumps, etc. Alternatively, the second thermally short-circuiting member (heat radiation member) 72 can be adapted to the topology shown in FIG. 1, which does not include the first thermally short-circuiting member (heat radiation pad) 71, for instance.

In the holder 1 according to a modification of the second embodiment shown in FIG. 12, it is preferable that the second thermally short-circuiting member (heat radiation member) 72 should connect to the supplementary holder-site heat conduction passages 5a and 5e. Since the configuration in which the supplementary holder-site heat conduction passages 5a and 5e are connected by the second thermally short-circuiting member (heat radiation member) 72, makes the effective surface areas of the holder-site heat conduction passages 5a, 5b, 5c, 5d, 5e, . . . larger, it is possible to significantly increase the radiation efficiency. Therefore, the holder 1 according to the modification of the second embodiment can suppress thermal interference of the active regions 22a, 22b, 22c, 22d, . . . further than the holder 1 of the first embodiment.

As shown in FIG. 12, by the configuration in which all of the ends of the holder-site heat conduction passages 5a, 5b, 5c, 5d, 5e, . . . are short-circuited by the second thermally short-circuiting member (heat radiation member) 72, the potential of each of the holder-site heat conduction passages 5a, 5b, 5c, 5d, 5e, . . . can be kept fixed. Therefore, the electrical isolation between the electric interconnects 4a, 4b, 4c, 4d, . . . can be ensured further by connecting the holder-site heat conduction passages 5a, 5b, 5c, 5d, 5e, . . . to a ground line or an external power supply, and thereby crosstalk noise between the electric interconnects 4a, 4b, 4c, 4d, . . . can be surely suppressed.

Similar to the holder 1 of FIG. 11, in the holder 1 according to the modification of the second embodiment shown in FIG. 12, the holder-site heat conduction passages 5a, 5b, 5c, 5d, 5e, . . . can be made from metallic materials. When the holder-site heat conduction passages 5a, 5b, 5c, 5d, 5e, . . . are made from metallic materials, because the heat conduction passages 5a, 5b, 5c, 5d, 5e, . . . can have electric conductivity simultaneously, the heat conduction passages 5a, 5b, 5c, 5d, 5e, . . . can be used as ground lines so as to electrically isolate the electric interconnects 4a, 4b, 4c, 4d, . . . .

THIRD EMBODIMENT

Usually, an outer surface of a cladding layer of an optical fiber is covered with an ultraviolet (UV) light cured resin coating layer. The coating layer serve as what is called "buffer coating" of an optical fiber cable. The thickness of the coating layer is about 400 µm, for example, and is usually larger than an outside diameter of the optical fiber itself. Namely, the optical fiber and the coating layer make a single piece of the optical fiber cable. If each of the above-mentioned optical fiber cables encompassing the coating layer can be inserted directly as a single piece of an optical transmission lines in each of the cylindrical through-holes 2a, 2b, 2c, 2d, . . . , respectively, it is possible to significantly increase strength of mechanical coupling between the optical transmission lines and the holder 1. However, for boring cylindrical through-holes 2a, 2b, 2c, 2d, . . . each having an enough inside diameter so that the coating layer having a large outside diameter can be inserted in the cylindrical through-holes 2a, 2b, 2c, 2d, . . . , a thickness defined between the interconnection face (first side face) 1C and bonding face (third side face) 1E of the holder 1 must keep a predetermined value. As it is clear from FIG. 1, as the thickness of the holder 1 becomes larger, the length of electric interconnects 4a, 4b, 4c, 4d, . . . formed on the mounting face 1 becomes longer, which increases interconnection capacitance, reactance and resistance etc. In other words, reinforcement of the strength of mechanical coupling between the optical transmission lines and the holder 1 has a trade-off relationship with electrical characteristic such as interconnection capacitance, reactance and resistance etc.

Figure 13A:
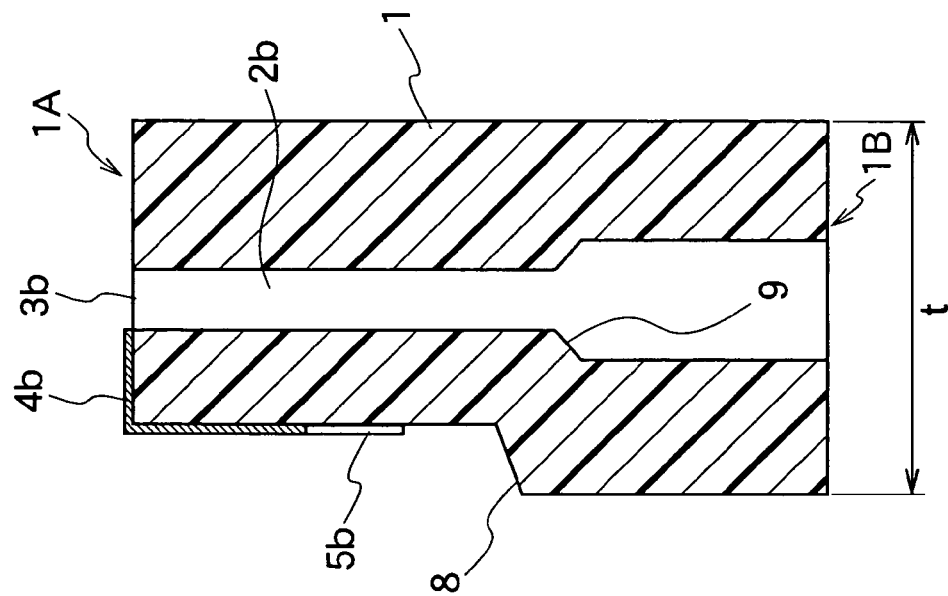
FIG. 13A is a plan view of a holder according to a third embodiment of the present invention.
Figure 13B:
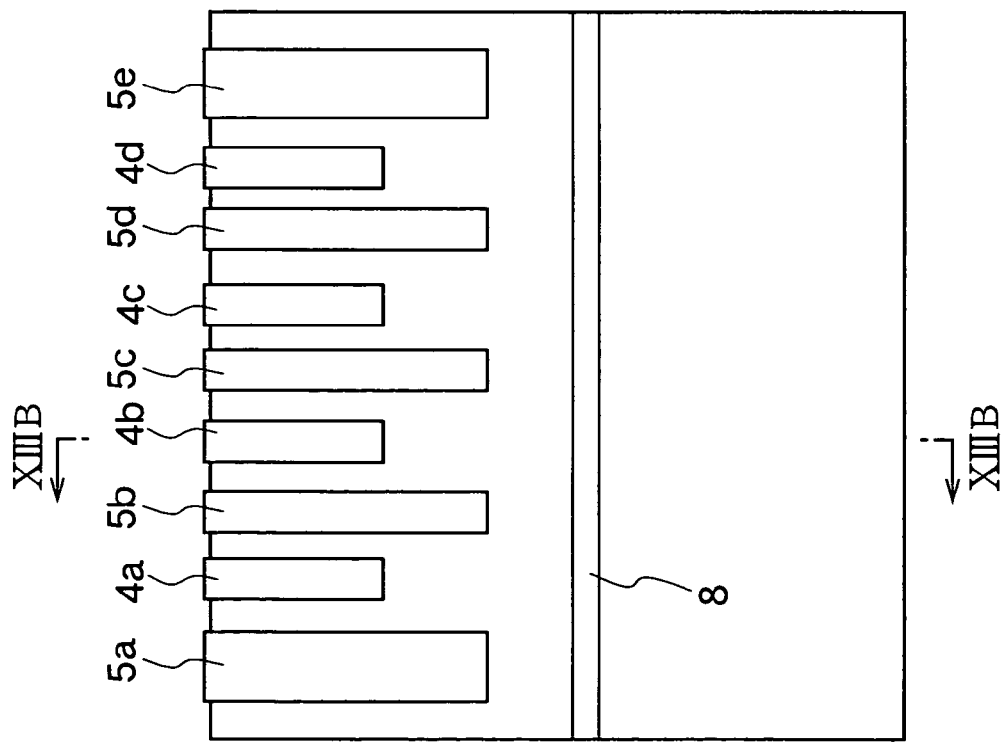
FIG. 13B is a cross-sectional taken on line XIIIB—XIIIB in FIG. 13A.

FIGS. 13A and 13B show a schematic configuration of the holder 1 according to a third embodiment of the present invention. FIG. 13A is a plan view of the holder 1 and FIG. 13B is a cross-sectional view of the holder 1 taken on line XIIIB-XIIIB in FIG. 13A. In the holder 1 according to the third embodiment of the present invention, the inside diameter of the cylindrical through-hole 2b has an inside step in a portion located between the mounting face 1A and the opposing face 1B so that the inside diameter becomes larger in a portion near the opposing face 1B. Although in the cross-sectional view of FIG. 13B, the inside step 9 is shown as a tapered two-dimensional geometry, the inside step 9 implements part of a cone, which is symmetrical along a central axis of the cylindrical through-hole 2b, in a three-dimensional view. Namely, the conical inside step 9 exists as a diameter conversion region from a smaller inside diameter portion near the mounting face 1A is converted to a larger inside diameter portion near the opposing face 1B. And, the holder 1 of the third embodiment has an outside step 8 accomplishing a flat projection in the interconnection face (first side face) 1C. The outside step 8 extends along a direction parallel with the mounting face 1A and the opposing face 1B.

As shown in the cross-sectional view of FIG. 13B, the electric interconnect 4b extends on the surfaces of the base body 1, covering over to the interconnection face (first side face) 1C from the mounting face 1A. At the rear side of the electric interconnect 4b, the heat conduction passage 5b also extends to the interconnection face (first side face) 1C from the mounting face 1A. Although illustrations are omitted, the other cylindrical through-holes 2a, 2c and 2d have inside steps in the portion located between the mounting face 1A and the opposing face 1B so that the inside diameter of the cylindrical through-holes 2a, 2c and 2d become larger at the rear portion near the opposing face 1B. And the other electric interconnects 4a, 4c, 4d and the other heat conduction passages 5a, 5c, 5d, 5e also extend on the surfaces of the base body 1, to the interconnection face (first side face) 1C from the mounting face 1A.

The larger inside diameter of the cylindrical through-hole 2b, extending from the position of the inside step 9 to the opposing face 1B, has a size to facilitate the insertion of a coating layer of the optical transmission line (optical fiber). According to the holder 1 of the third embodiment, by providing the outside step 8 on the interconnection face (first side face) 1C at a location between the mounting face 1A and the opposing face 1B of the holder 1, thickness of the holder 1 at the mounting face 1A side can become thinner than the thickness "t" at the opposing face 1B, which can resolve the problem of trade-off relationship between the electrical characteristic and the mechanical strength of the holder 1, and can improve both of the electrical characteristic and the mechanical strength of the holder 1. Therefore, the thermal interference between each of the optical semiconductor elements integrated in an optical device chip, which is configured to be mounted on the mounting face 1A can be suppressed and mechanical strength and packaging reliability of the holder 1 is improved.

First Modification of the Third Embodiment

As shown in FIG. 14, the holder 1 according to a modification (a first modification) of the third embodiment of the present invention, is different from the holder 1 of the third embodiment shown in FIGS. 13A and 13B in that only three holding-member-site heat conduction passages 5b, 5c and 5d are formed so as to extend from the mounting face 1A to the opposing face 1B, the holding-member-site heat conduction passages 5b, 5c and 5d are mutually disposed in parallel in the locations between the openings 3a, 3b, 3c, 3d, . . . on the mounting face 1A, without having the supplementary heat conduction passages 5a and 5e disposed outside of and sandwiching the inner electric interconnections 4a, 4b, 4c and 4d of the third embodiment.

As already explained in the first embodiment, although the outer heat conduction passages 5a and 5e serves as the similar function to the inner heat conduction passages 5b, 5c and 5d, the outer heat conduction passages 5a and 5e can be omitted since the outer heat conduction passages 5a and 5e are formed as supplementary patterns so as to keep a symmetrical thermal flow. Therefore, as shown in FIG. 14, in the holder 1 according to the first modification of the third embodiment, circular pads 7a and 7e are disposed on the mounting face 1A instead of the outer heat conduction passages 5a and 5e.

Second Modification of the Third Embodiment

Figure 15A:
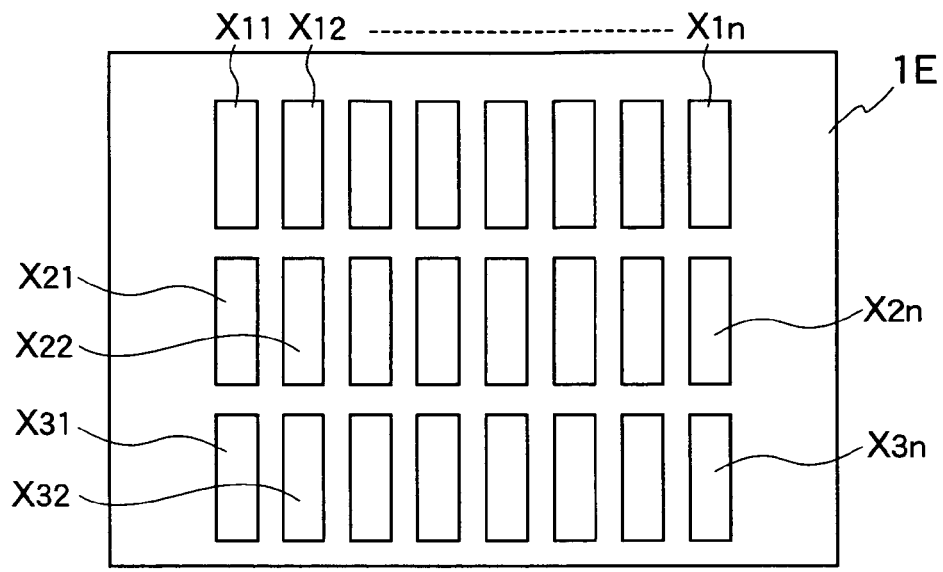
FIG. 15A is a plan view illustrating a third side face, which may be assigned as a back surface of the holder according to another modification (second modification) of the third embodiment of the present invention.
Figure 15B:
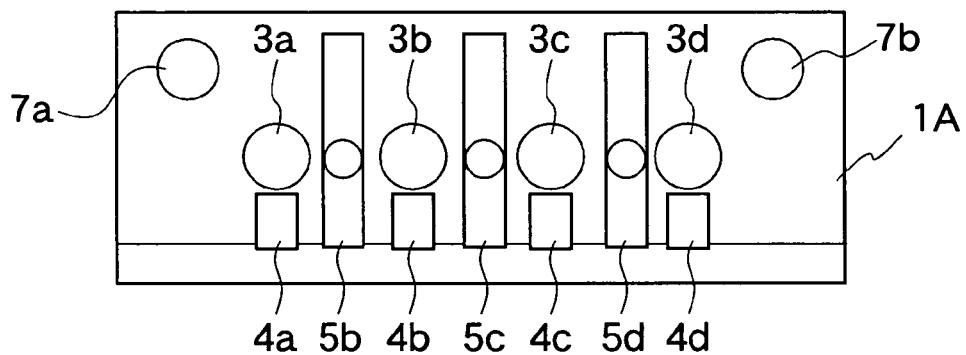
FIG. 15B is a front view illustrating a mounting face of the holder according to the second modification of the third embodiment.
Figure 15C:
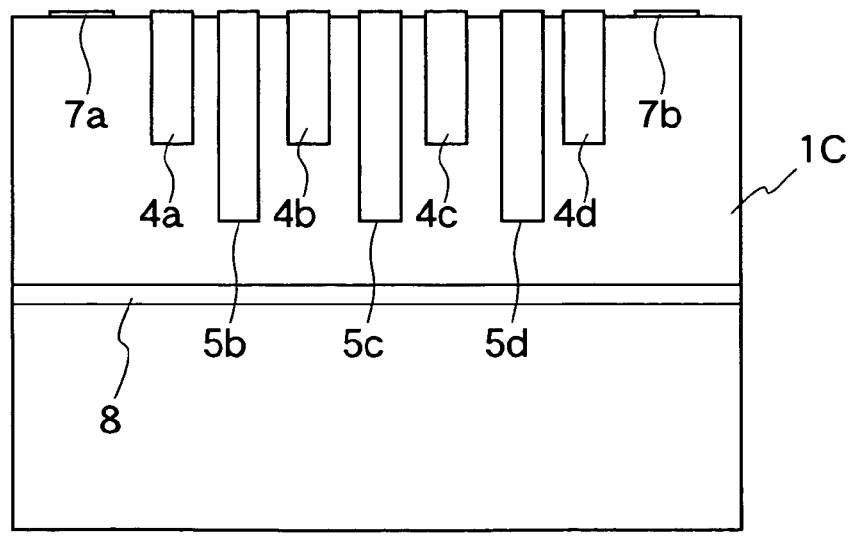
FIG. 15C is a plan view illustrating an interconnection face (first side face) 1C of the holder according to the second modification of the third embodiment.

In the holder 1 according to still another modification (second modification) of the third embodiment of the present invention, as shown in FIG. 15, another pattern and topology delineated on the bonding face (third side face) 1E is explained. FIG. 15A is a plan view illustrating a configuration delineated on the bonding face (third side face) 1E, which may be assigned as a back surface of the holder 1. FIG. 15B is a front view illustrating a configuration delineated on the mounting face 1A, showing that the circular pads 7a and 7e are disposed outside of and sandwiching the inner electric interconnections 4a, 4b, 4c and 4d. FIG. 15C is a plan view illustrating the interconnection face (first side face) 1C. Since the illustration of FIG. 15C is similar to the configuration shown in FIG. 14A, overlapped explanations are omitted.

The bonding face (third side face) 1E opposing to the interconnection face (first side face) 1C is used as a bonding plane for bonding the holder 1 on a packaging substrate, etc. In the second modification of the third embodiment, as shown in FIG. 15A, a plurality of rectangular metallic patterns (short strip patterns) $X_{ij}$ (i=1–3; j=1–n) are delineated on the bonding face (third side face) 1E, for bonding the holder 1 on to the packaging substrate, in a matrix configuration. As shown in FIG. 15A, by forming the divided metallic patterns $X_{ij}$ on the bonding face (third side face) 1E in a matrix of short strips, absolute value of the stress due to the difference in the linear thermal expansion coefficient in the metallic patterns $X_{ij}$ can be decreased and the possibility of the warp of the metallic patterns $X_{ij}$, or the destruction of the metallic patterns $X_{ij}$ according to the level of warping after the bonding process can be reduced.

FOURTH EMBODIMENT

Figure 16A:
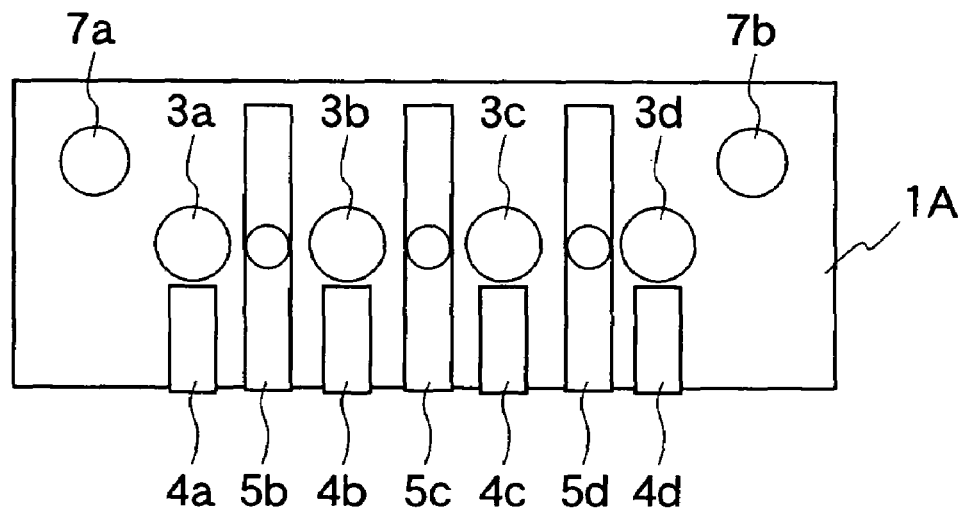
FIG. 16A is a front view of a mounting face of a holder according to a fourth embodiment of the present invention.
Figure 16B:
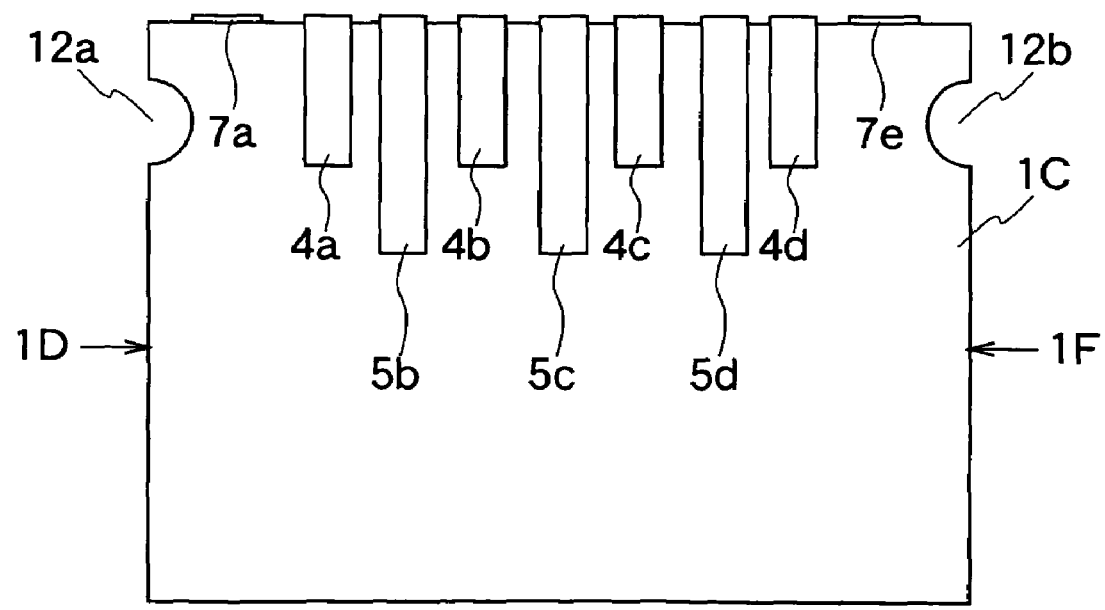
FIG. 16B is a plan view of a first side face corresponding to the mounting face in FIG. 16A.

FIG. 16 is a schematic view illustrating a configuration of a holder 1 according to a fourth embodiment of the present invention. The holder 1 according to the fourth embodiment is different from the configurations discussed in the first to third embodiments, in that the holder 1 according to the fourth embodiment encompasses circular recesses 12a and 12b on each part of a second side face 1D and a fourth side face 1F facing to the second side face 1D. The recesses 12a and 12b extend from an interconnection face (first side face) 1C to a bonding face (third side face) 1E to facilitate a positioning when the holder 1 is mounted on a packaging board. By inserting circular positioning pins, each of which has an outside diameter approximately same as the inside diameter of the recesses 12a and 12b, for example, from the outside of the holder 1 into the recesses 12a and 12b, positioning and orientation of the holder 1 can be determined almost precisely, which can facilitate a wire bonding process to connect an outer circuit to the electric interconnections 4a, 4b, 4c, 4d, . . . . And the configuration in which the holder 1 is adhered by adhesive substance to the external positioning pins at the recesses 12a and 12b can increase bonding intensity between the holder 1 and the packaging board, or can prevent from destruction of the holder 1 when the optical transmission line is pulled tightly from rear side of the holder 1.

The other configurations of the holder 1 of the fourth embodiment are similar to the configurations shown in the first to third embodiments, overlapped explanations are omitted.

OTHER EMBODIMENTS

Various modifications will become possible for those skilled in the art after receiving the teaching of the present disclosure without departing from the scope thereof. For instance, the above-mentioned circular recesses 12a and 12b can be grooved in the second side face 1D and the fourth side face 1F for the configurations already discussed in the first to the third embodiments.

As another example, in the holders 1 of the first to second embodiment, the circular pads 7a and 7b shown in FIGS. 14 to 16 according to the third to fourth embodiments can be disposed on the mounting face 1A instead of the supplementary heat conduction passages 5a and 5b. Furthermore, the circular pads 7a and 7b can also be omitted.

Furthermore, the configuration in which an optical wave-guiding film (multi-core optical wave-guide) 32 is employed in the first modification of the first embodiment, the configuration in which a chamfer 10 is provided at an intersectional corner between the mounting face 1A and the interconnection face (first side face) 1C, as explained in the third modification of the first embodiment and the configuration in which a normal direction Sn of the mounting face 1A of the holder 1 declines slightly toward an axial direction of the through-holes 2a, 2b, 2c, 2d, . . . as explained in the fourth and fifth modifications of the first embodiment, can be applied to various holders 1 explained in the second to fourth embodiments.

Similarly, the configuration in which divided metallic patterns $X_{ij}$ are delineated on the third side face explained in the second modification of the first embodiment and the second modification of the third embodiment can be of course adoptable for the holders 1 explained in the second and fourth embodiments. Thus, the present invention of course includes various embodiments and modifications and the like which are not detailed above. Therefore, the scope of the present invention will be defined in the following claims.

What is claimed is:

1. A holder of optical transmission lines, comprising:
    an insulating base body defined by a mounting face configured to mount an optical device chip, an opposing face opposing to the mounting face and a plurality of side faces which connect between the mounting face and the opposing face, one of side faces is assigned as an interconnection face, and provided with a plurality of through-holes penetrating between the mounting face and the opposing face so as to hold a plurality of optical transmission lines, the through-holes define a plurality of openings on the mounting face by intersecting the mounting face;

a plurality of electric interconnections extending from respective vicinities of the openings on the mounting face on to the interconnection face; and a plurality of heat conduction passages assigned alternately with the electric interconnections, extending from the mounting face on to the interconnection face, each of the heat conduction passages has a length longer than the length of the electric interconnections on the interconnection face.

2. The holder of claim 1, wherein each of the heat conduction passages has a length longer than the length of the electric interconnections on the mounting face.

3. The holder of claim 1, wherein a normal direction of the mounting face declines toward an axial direction of the through-holes.

4. The holder of claim 3, wherein a normal direction of the opposing face declines toward the axial direction of the through-holes.

5. The holder of claim 3, wherein the opposing face is orientated in parallel with the mounting face.

6. The holder of claim 3, wherein an angle between the normal direction of the mounting face and the axial direction of the through-holes is about 4 to 10 degrees.

7. The holder of claim 1, further comprising a thermally short-circuiting member configured to thermally short-circuit the heat conduction passages.

8. The holder of claim 1, wherein an outside step is provided in the interconnection face.

9. The holder of claim 1, wherein a chamfer is established at an intersectional corner between the mounting face and the interconnection face, and the electric interconnections and the heat conduction passages extend on to the interconnection face from the mounting face.

10. The holder of claim 1, further comprising a plurality of metallic patterns delineated on one of the side faces opposing to the interconnection face, configured to bond the holder to a packaging substrate.

11. The holder of claim 1, further comprising a recess formed perpendicular to the interconnection face, which can accommodate a positioning pin to determine a position of the holder against a packaging substrate.

12. The holder of claim 1, wherein each of the heat conduction passages is formed in a strip pattern.

13. The holder of claim 1, wherein each of the heat conduction passages is electrically conductive.

14. A holder of a multi-core optical wave-guide, comprising:

an insulating base body defined by a mounting face configured to mount an optical device chip, an opposing face opposing to the mounting face and a plurality of side faces which connect between the mounting face and the opposing face, one of side faces is assigned as an interconnection face, and provided with a through-hole penetrating between the mounting face and the opposing face so as to hold the multi-core optical wave-guide, the through-hole define an opening on the mounting face by intersecting the mounting face;

a plurality of electric interconnections extending from vicinity of the opening on the mounting face on to the interconnection face; and a plurality of heat conduction passages assigned alternately with the electric interconnections, extending from the mounting face on to the interconnection face, each of the heat conduction passages has a length longer than the length of the electric interconnections on the interconnection face.

15. The holder of claim 14, wherein a normal direction of the mounting face declines toward an axial direction of the through-hole.

16. The holder of claim 15, wherein a normal direction of the opposing face declines toward the axial direction of the through-hole.

17. The holder of claim 15, wherein an angle between the normal direction of the mounting face and the axial direction of the through-hole is about 4 to 10 degrees.

18. The holder of claim 14, further comprising a thermally short-circuiting member configured to thermally short-circuit the heat conduction passages.

19. The holder of claim 14, wherein an outside step is provided in the interconnection face.

20. The holder of claim 14, further comprising a plurality of metallic patterns delineated on one of the side faces opposing to the interconnection face, configured to bond the holder to a packaging substrate.

* * * * *